United States Patent
Gao et al.

(10) Patent No.: US 12,432,035 B2
(45) Date of Patent: Sep. 30, 2025

(54) METHODS FOR COMMUNICATION, TERMINAL DEVICE, NETWORK DEVICE, AND COMPUTER READABLE MEDIA

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 422 days.

(21) Appl. No.: 17/920,834

(22) PCT Filed: Apr. 28, 2020

(86) PCT No.: PCT/CN2020/087504
§ 371 (c)(1),
(2) Date: Oct. 24, 2022

(87) PCT Pub. No.: WO2021/217419
PCT Pub. Date: Nov. 4, 2021

(65) Prior Publication Data
US 2023/0171073 A1    Jun. 1, 2023

(51) Int. Cl.
*H04L 5/00* (2006.01)
*H04L 1/1829* (2023.01)
(Continued)

(52) U.S. Cl.
CPC .......... *H04L 5/0073* (2013.01); *H04L 1/1854* (2013.01); *H04L 5/0055* (2013.01); *H04W 72/0446* (2013.01); *H04W 72/23* (2023.01)

(58) Field of Classification Search
CPC ... H04L 5/0073; H04L 1/1854; H04L 5/0055; H04L 1/1896; H04W 72/0446; H04W 72/23
See application file for complete search history.

(56) References Cited

U.S. PATENT DOCUMENTS

2019/0342040 A1    11/2019  Tirola et al.

FOREIGN PATENT DOCUMENTS

| CN | 110537390 A | 12/2019 |
| JP | 2019-521623 A | 7/2019 |

(Continued)

OTHER PUBLICATIONS

JP Office Communication for JP Application No. 2022-565930, mailed on Oct. 17, 2023 with English Translation.

(Continued)

*Primary Examiner* — Eric Myers
(74) *Attorney, Agent, or Firm* — Sughrue Mion, PLLC

(57) ABSTRACT

Embodiments of the present disclosure provide a solution for improving feedback information for transmissions with repetition in a communication system. In a method for communication, a terminal device can obtain a first group of candidate offsets for transmissions of a first type and a second group of candidate offsets for transmissions of a second type. The terminal device may receive, from the network device, scheduling information for scheduling a transmission in a first slot, the scheduling information comprising a target offset selected from the first group of candidate offsets, the target offset indicating a second slot associated with a feedback indication for the transmission. The terminal device may determine a set of slots based on the second slot and the first group of candidate offsets. The terminal device may transmit, to the network device in the second slot, a set of feedback indications for the set of slots. Embodiments of the present disclosure can optimize and improve the reporting of feedback information by the terminal device to the network device in the communication system.

12 Claims, 19 Drawing Sheets

(51) Int. Cl.
*H04W 72/0446* (2023.01)
*H04W 72/23* (2023.01)

(56) References Cited

FOREIGN PATENT DOCUMENTS

| | | |
|---|---|---|
| WO | 2020/026292 A1 | 2/2020 |
| WO | 2020/068252 A1 | 4/2020 |

OTHER PUBLICATIONS

NTT Docomo, Inc. "DL/UL scheduling and HARQ management", 3GPP TSG RAN WG1 #90b R1-1718217, Oct. 13, 2017, pp. 1-pp. 14.

Huawei, HiSilicon, "Summary of Enhancements on Multi TRP/Panel Transmission", 3GPP TSG RAN WG1 #98 R1-1909602, Aug. 30, 2019, pp. 1-pp. 76.

Nokia et al., "HARQ scheduling and feedback for NR-U", 3GPP TSG RAN WG1 Ad-Hoc Meeting #97, R1-1906644, May 13-18, 2019, 14 pages.

International Search Report of PCT/CN2020/087504 dated Jan. 27, 2021 [PCT/ISA/210].

Written Opinion of PCT/CN2020/087504 dated Jan. 27, 2021 [PCT/ISA/237].

Extended European Search Report issued May 4, 2023 in European Application No. 20934168.4.

CATT, "Remaining issues on NR HARQ timing", 3GPP TSG RAN WG1 Meeting #92bis, R1-1803758, Apr. 16-20, 2018, Sanya, China (7 pages total).

METHODS FOR COMMUNICATION, TERMINAL DEVICE, NETWORK DEVICE, AND COMPUTER READABLE MEDIA

CROSS REFERENCE TO RELATED APPLICATIONS

This application is a National Stage of International Application No. PCT/CN2020/087504 filed on Apr. 28, 2020.

FIELD

Embodiments of the present disclosure generally relate to the field of communication, and more particularly, to a solution for reporting feedback information by a terminal device to a network device in a communication system.

BACKGROUND

The latest developments of the Third Generation Partnership Project (3GPP) standards are referred to as Long Term Evolution (LTE) of Evolved Packet Core (EPC) network and Evolved Universal Mobile Telecommunications System (UMTS) Terrestrial Radio Access Network (E-UTRAN), also commonly termed as '4G.' In addition, the term '5G New Radio (NR)' refers to an evolving communication technology that is expected to support a variety of applications and services. The 5G NR is part of a continuous mobile broadband evolution promulgated by the 3GPP to meet new requirements associated with latency, reliability, security, scalability (for example, with Internet of Things), and other requirements. Some aspects of the 5G NR may be based on the 4G Long Term Evolution (LTE) standards.

In RAN #86, a work item description (WID) on further enhanced multiple input multiple output (FeMIMO) was agreed. In general, MIMO includes features that facilitate utilization of a large number of antenna elements at a base station for both sub-6 GHz and over-6 GHz frequency bands. In Rel-17, various channels in addition to physical downlink shared channels (PDSCHs) can benefit from multi-TRP (transmission and reception point) transmissions (as well as multi-panel receptions) which also include multi-TRP for inter-cell operations. In addition, repetitions of transmission of downlink channels (such as physical downlink control channels, PDCCHs, or PDSCHs) are agreed to be introduced.

SUMMARY

In general, embodiments of the present disclosure provide a solution for reporting feedback information by a terminal device to a network device in a communication system.

In a first aspect, there is provided a method for communication. The method comprises obtaining, at a terminal device, a first group of candidate offsets and a second group of candidate offsets, the first group of candidate offsets being between a slot associated with a transmission of a first type from a network device to the terminal device and a slot associated with a feedback indication for the transmission of the first type, the second group of candidate offsets being between a slot associated with a transmission of a second type from the network device to the terminal device and a slot associated with a feedback indication for the transmission of the second type. The method also comprises receiving, from the network device, scheduling information for scheduling a transmission in a first slot, the scheduling information comprising a target offset selected from the first group of candidate offsets, the target offset indicating a second slot associated with a feedback indication for the transmission. The method also comprises determining a set of slots based on the second slot and the first group of candidate offsets. The method further comprises transmitting, to the network device in the second slot, a set of feedback indications for the set of slots.

In a second aspect, there is provided a method for communication. The method comprises determining, at a network device, a first group of candidate offsets and a second group of candidate offsets, the first group of candidate offsets being between a slot associated with a transmission of a first type from the network device to a terminal device and a slot associated with a feedback indication for the transmission of the first type, the second group of candidate offsets being between a slot associated with a transmission of a second type from the network device to the terminal device and a slot associated with a feedback indication for the transmission of the second type. The method also comprises transmitting, to the terminal device, scheduling information for scheduling a transmission in a first slot, the scheduling information comprising a target offset selected from the first group of candidate offsets, the target offset indicating a second slot associated with a feedback indication for the transmission. The method also comprises determining a set of slots based on the second slot and the first group of candidate offsets. The method further comprises receiving, from the terminal device in the second slot, a set of feedback indications for the set of slots.

In a third aspect, there is provided a method for communication. The method comprises receiving, at a terminal device from a network device, first scheduling information for scheduling a first transmission from the network device to the terminal device in a first slot, the first scheduling information indicating a first offset between the first slot and a feedback slot associated with a feedback indication for the first transmission. The method also comprises receiving, from the network device, second scheduling information for scheduling a second transmission in a second slot, the second transmission being a repetition of the first transmission, the second scheduling information indicating a second offset between the second slot and the feedback slot. The method also comprises selecting one of the first offset and the second offset based on a comparison between first timing associated with the first transmission and second timing associated with the second transmission. The method further comprises determining, based on the selected one of the first offset and the second offset, a position of the feedback indication in a set of feedback indications to be transmitted in the feedback slot to the network device.

In a fourth aspect, there is provided a method for communication. The method comprises determining, at a network device, a first offset between a first slot associated with a first transmission from the network device to a terminal device and a feedback slot associated with a feedback indication for the first transmission. The method also comprises determining a second offset between a second slot associated with a second transmission and the feedback slot, the second transmission being a repetition of the first transmission. The method also comprises selecting one of the first offset and the second offset based on a comparison between first timing associated with the first transmission and second timing associated with the second transmission. The method further comprises determining, based on the selected one of the first offset and the second offset, a position of the feedback indication in a set of feedback indications to be received in the feedback slot from the terminal device.

In a fifth aspect, there is provided a method for communication. The method comprises determining, at a terminal device, a set of slots for which a set of feedback indications are to be transmitted to a network device, based on a feedback slot for transmitting the set of feedback indications. The method also comprises in accordance with a determination that a feedback indication for a transmission from the network device to the terminal device in one of the set of slots is not scheduled to be transmitted in the feedback slot and is configured to be repeatedly transmitted, generating the set of feedback indications to include the feedback indication for the transmission. The method further comprises transmitting the set of feedback indications to the network device in the feedback slot.

In a sixth aspect, there is provided a method for communication. The method comprises determining, at a network device, a set of slots for which a set of feedback indications are to be received from a terminal device, based on a feedback slot for receiving the set of feedback indications. The method also comprises in accordance with a determination that a feedback indication for a transmission from the network device to the terminal device in one of the set of slots is not scheduled to be received in the feedback slot and is configured to be repeatedly received, determining that the set of feedback indications includes the feedback indication for the transmission. The method further comprises receiving the set of feedback indications from the terminal device in the feedback slot.

In a seventh aspect, there is provided a terminal device. The terminal device comprises a processor and a memory storing instructions. The memory and the instructions are configured, with the processor, to cause the terminal device to perform the method according to the first aspect, the third aspect, or the fifth aspect.

In an eighth aspect, there is provided a network device. The network device comprises a processor and a memory storing instructions. The memory and the instructions are configured, with the processor, to cause the network device to perform the method according to the second aspect, the fourth aspect, or the sixth aspect.

In a ninth aspect, there is provided a computer readable medium having instructions stored thereon. The instructions, when executed on at least one processor of a device, cause the device to perform the method according to the first aspect, the third aspect, or the fifth aspect.

In a tenth aspect, there is provided a computer readable medium having instructions stored thereon. The instructions, when executed on at least one processor of a device, cause the device to perform the method according to the second aspect, the fourth aspect, or the sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
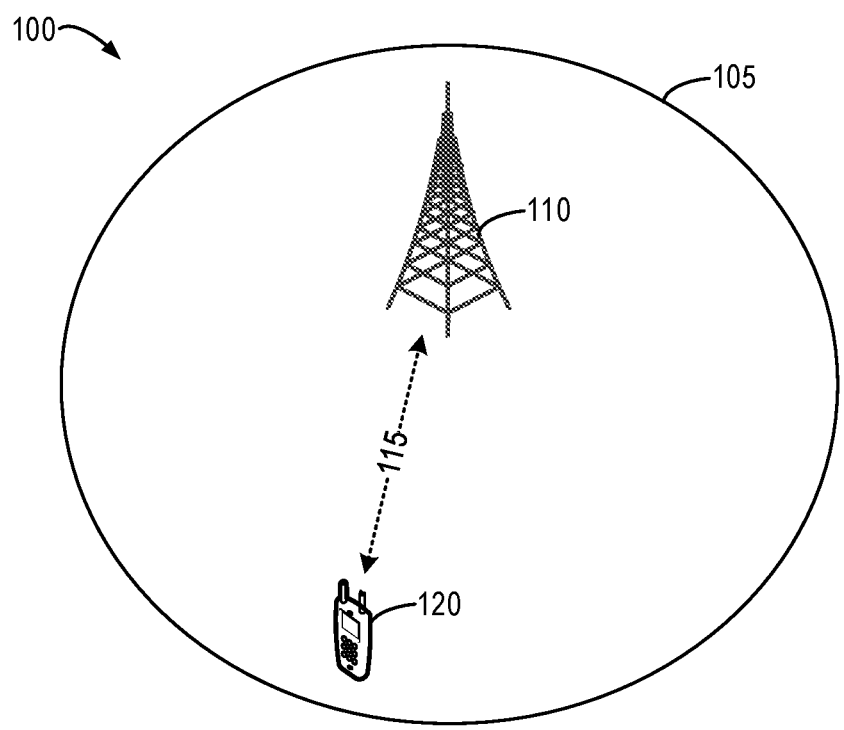
FIG. 1 is a schematic diagram of a communication environment in which some embodiments of the present disclosure can be implemented.

Principles of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), vehicle-mounted terminal devices, devices of pedestrians, roadside units, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

In some embodiments, a terminal device may be connected with a first network device and a second network device. One of the first network device and the second network device may be a master node and the other one may be a secondary node. The first network device and the second network device may use different radio access technologies (RATs). In some embodiments, the first network device may be a first RAT device and the second network device may be a second RAT device. In some embodiments, the first RAT device is an eNB and the second RAT device is a gNB. Information related to different RATs may be transmitted to the terminal device from at least one of the first network device and the second network device. In some embodiments, first information may be transmitted to the terminal device from the first network device and second information may be transmitted to the terminal device from the second network device directly or via the first network device. In some embodiments, information related to configuration for the terminal device configured by the second network device may be transmitted from the second network device via the first network device. Information related to reconfiguration for the terminal device configured by the second network device may be transmitted to the terminal device from the second network device directly or via the first network device.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present disclosure, and may not be limited to a specific term or word. As used herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some embodiments of the present disclosure. It is noted that embodiments of the present disclosure are equally applicable to other resources in other domains.

As used herein, the singular forms "a," "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As indicated above, repetitions of transmission of downlink channels (such as PDCCHs or PDSCHs) are agreed to be introduced. Further, in recent 3GPP meeting discussions or agreements, enhancements on the support for multi-TRP deployment targeting both Frequency Range 1 (FR1) and FR2 are agreed as follows. Features may need to be identified and specified to improve reliability and robustness for channels in addition to PDSCHs (that is, PDCCHs, physical uplink shared channels, PUSCHs, and physical uplink control channels, PUCCHs) using multiple TRPs and/or multiple panels, with Rel-16 reliability features as the baseline. Features may need to be identified and specified to enable inter-cell multi-TRP operations. Enhancements for simultaneous multi-TRP transmission and multi-panel reception may need to be evaluated and, if needed, be specified.

However, traditional solutions are designed for downlink transmissions (for example, PDCCHs and/or PDSCHs) without repetition. Additionally, in the traditional solutions, feedback information (for example, a semi-static HARQ-ACK codebook) to be reported by a terminal device to a network device may be defined based on a configured or preconfigured set of K1 values, each K1 value indicating an offset between a slot associated with a downlink transmission and a slot associated with a feedback indication for the downlink transmission. Currently, there are still no details on how PDCCH and/or PDSCH repetitions are designed, and how to design and report the feedback information if a downlink transmission (for example, a PDCCH or a PDSCH) is repeatedly transmitted from the network device to the terminal device.

Therefore, traditional solutions are not suitable for repetitive downlink transmissions, for example, repeated PDCCHs and/or PDSCHs. On one hand, if traditional design of feedback information (for example, the semi-static HARQ-ACK codebook) is applied to repeated downlink transmissions (such as PDCCHs and/or PDSCHs), much unnecessary overhead of the feedback information may be caused. For example, feedback indications (or feedback fields) based on the K1 values associated with repetitive transmissions may be redundant and unnecessary in feedback information, if feedback indications (or feedback fields) for first-time transmissions of the repetitive transmissions are already included in the feedback information.

On the other hand, the design of feedback information (for example, a HARQ-ACK feedback codebook) may need to be based on the repetition structure of the downlink transmissions, such as the PDCCH and/or PDSCH repetition structure. For example, a PDCCH may be within a set of time and frequency resources defined in a control resource set (CORESET). If multiple CORESETs (such as two CORESETs) are configured for PDCCH repetitions, for example, a PDCCH in a second CORESET is a repetition of a PDCCH in a first CORESET, then the feedback information according to traditional solutions may include some repetitive and unnecessary parts.

In order to solve the above technical problems and potentially other technical problems in conventional solutions, embodiments of the present disclosure provide a solution for reporting feedback information by a terminal device to a network device in a communication system. In some embodiments, the network device may configure or indicate a first group of candidate offsets and/or a second group of candidate offsets to the terminal device. In some embodiments, a first group of candidate offsets and a second group of candidate offsets can be configured or preconfigured at both sides of the terminal device and the network device. Each candidate offset in the first group of candidate offsets may be used for a transmission of a first type to indicate a feedback slot for the transmission of the first type, and each candidate offset in the second group of candidate offsets may be used for a transmission of a second type to indicate a feedback slot for the transmission of the second type.

In general, the transmission of the first type may be a transmission which needs a feedback indication reported by the terminal device to the network device, and the transmission of the second type may be a transmission which does not need a feedback indication reported by the terminal device to the network device. For example, the transmission of the first type may be a transmission without repetition or a first-time transmission followed by at least one repetitive transmission. In contrast, the transmission of the second type may be a repetitive transmission of a preceding first-time transmission.

With the separate groups of candidate offsets for transmissions that need feedback indications and transmissions that do not need feedback indications, the feedback information (for example, a HARQ-ACK codebook) reported by the terminal device to the network device can be based on the first group of candidate offsets and not based on the second group of candidate offsets. In this way, repetitive and unnecessary feedback indications for repetitive transmissions can be effectively excluded from the feedback information reported by the terminal device to the network device, thereby eliminating unnecessary overhead of the feedback information.

In some other embodiments, the network device can transmit to the terminal device first scheduling information and second scheduling information to schedule a first transmission in a first slot and a second transmission (which is a repetition of the first transmission) in a second slot, respectively. The first scheduling information and the second scheduling information indicate a same feedback slot using a first offset and a second offset, respectively. The first offset is between the first slot and the feedback slot, and the second offset is between the second slot and the feedback slot.

In these embodiments, the network device and the terminal device can select one of the first offset and the second offset according to a same predefined rule, and then determine a position of a common feedback indication for both the first transmission and the second transmission in a set of feedback indications to be transmitted in the feedback slot. In this way, ambiguity of the position of the feedback indication in the set of feedback indications at both sides of the network device and the terminal device can be eliminated.

In some other embodiments, a set of feedback indications for a set of slots is to be reported by the terminal device to the network device in a feedback slot. If a feedback indication for a transmission in one of the set of slots is not scheduled to be reported in the feedback slot and is configured to be repeatedly reported, then the terminal device can generate the set of feedback indications to include the feedback indication (for example, a real or actual ACK/NACK indication) for the transmission, and the network device can determine that the set of feedback indications includes the feedback indication for the transmission. In this way, a real or actual feedback indication for the transmission can be reported by the terminal device to the network device in the feedback slot, even if the feedback indication for the transmission is not scheduled to be reported in the feedback slot, thereby improving reliability and robustness of the transmission.

In some other embodiments, two CORESETs in a same serving cell (or different serving cells) may be configured for transmitting a first-time transmission of a PDCCH and a repetitive transmission of the PDCCH, respectively. For example, a PDCCH associated with a second CORESET may be configured for a repetition of a PDCCH associated with a first CORESET. In such embodiments, the terminal device can remove one of a feedback portion (for example, one or more HARQ-ACK fields) for the first CORESET and a feedback portion (for example, one or more HARQ-ACK fields) for the second CORESET from feedback information (for example, a semi-static HARQ-ACK codebook) to be reported by the terminal device to the network device. In this way, unnecessary overhead of the feedback information can be eliminated.

In some further embodiments, two serving cells associated with the terminal device may be configured for transmitting a first-time transmission of a PDCCH and a repetitive transmission of the PDCCH, respectively. For example, a PDCCH associated with a second serving cell may be configured for a repetition of a PDCCH associated with a first serving cell. In such embodiments, the terminal device can remove one of a feedback portion (for example, one or more HARQ-ACK fields) for the first serving cell and a feedback portion (for example, one or more HARQ-ACK fields) for the second serving cell from feedback information (for example, a semi-static HARQ-ACK codebook) to be reported by the terminal device to the network device. In this way, unnecessary overhead of the feedback information can be eliminated.

In sum, through the above-mentioned various embodiments of the present disclosure, the reporting of feedback information by the terminal device to the network device in the communication system can be optimized and improved, thereby enhancing reliability and robustness of communications in the communication system. Principles and implementations of the present disclosure will be described in detail below.

FIG. 1 is a schematic diagram of a communication environment 100 in which some embodiments of the present disclosure can be implemented. As shown in FIG. 1, the communication environment 100, which may also be referred to as a communication network 100 or a communication system 100, includes a network device 110 serving a terminal device 120 located in a cell 105 of the network device 110. In particular, the terminal device 120 may communicate with the network device 110 via a communication channel 115.

For transmissions from the network device 110 to the terminal device 120, the communication channel 115 may be referred to as a downlink channel, whereas for transmissions from the terminal device 120 to the network device 110, the communication channel 115 may alternatively be referred to as an uplink channel. A more specific example of a communication scenario between the network device 110 and the terminal device 120 will be further described later with reference to FIG. 2.

In some embodiments, the network device 110 and the terminal device 120 may communicate with each other based on time slots (or slots for short) as defined in the 3GPP specifications. For example, for subcarrier spacing configuration $\mu$, slots are numbered $n_s^\mu \in \{0, \ldots, N_{slot}^{subframe,\mu}-1\}$ in an increasing order within a subframe and $n_{s,f}^\mu \in \{0, \ldots, N_{slot}^{frame,\mu}-1\}$ in an increasing order within a frame. There are $N_{symb}^{slot}$ consecutive Orthogonal Frequency Division Multiplexing (OFDM) symbols in a slot where $N_{symb}^{slot}$ depends on the cyclic prefix as given in related 3GPP specifications (TS 38.211), as shown in Table 1 and Table 2. The start of slot $n_s^\mu$ in a subframe is aligned in time with the start of OFDM symbol $n_s^\mu N_{symb}^{slot}$ in the same subframe. Other related definitions and information of slots can be found in existing or future 3GPP specifications. More generally, the term slot as used herein can refer to any existing defined unit of time or any unit of time to be defined in the future.

TABLE 1

Number of OFDM symbols per slot, slots per frame,
and slots per subframe for normal cyclic prefix.

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 2

Number of OFDM symbols per slot, slots per frame,
and slots per subframe for extended cyclic prefix.

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

It is to be understood that the number of the terminal devices, the number of the network devices, the number of cells, and the number of channels as shown in FIG. 1 are only for the purpose of illustration without suggesting any limitations. The communication environment 100 may include any suitable number of terminal devices, any suitable number of network devices, any suitable number of other communication devices, any suitable number of cells, and any suitable number of channels adapted for implementing embodiments of the present disclosure.

In addition, it would be appreciated that there may be various wireless communications as well as wireline communications (if needed) among all the communication devices. Moreover, it is noted that although the network device 110 is schematically depicted as a base station and the terminal device 120 is schematically depicted as a mobile phone in FIG. 1, it is understood that these depictions are only for example without suggesting any limitation. In other embodiments, the network device 110 may be any other wireless network device, and the terminal device 120 may be any other wireless communication device.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
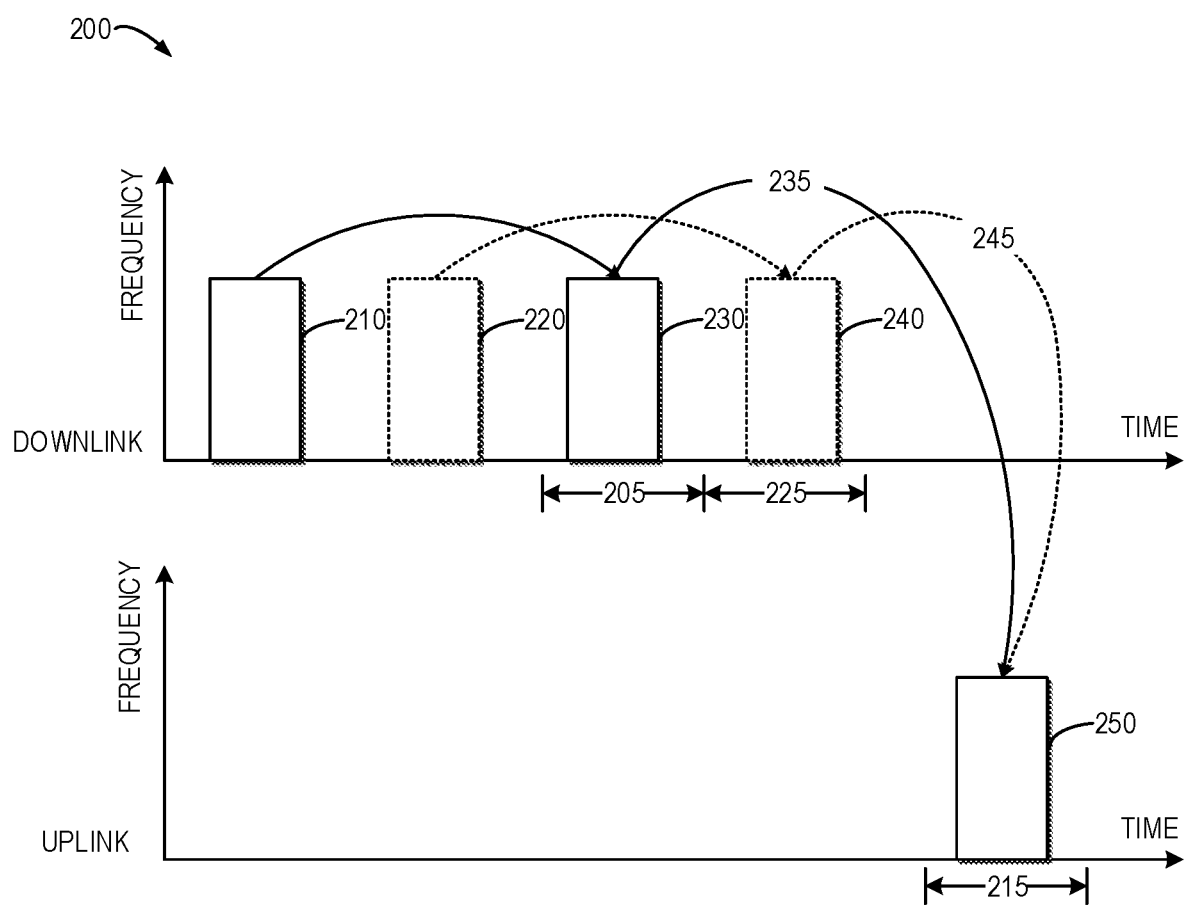
FIG. 2 illustrates an example scenario in which a network device transmits scheduling information to a terminal device to schedule a downlink transmission and potentially transmits further scheduling information to the terminal device to schedule a repetitive downlink transmission, and the terminal device transmits to the network device feedback information including a feedback indication for the downlink transmission, in accordance with some embodiments of the present disclosure.

FIG. 2 illustrates an example scenario 200 in which the network device 110 transmits scheduling information 210 to the terminal device 120 to schedule a downlink transmission 230 and potentially transmits further scheduling information 220 to the terminal device 120 to schedule a repetitive downlink transmission 240, and the terminal device 120 transmits to the network device 110 feedback information (for example, a HARQ-ACK codebook) 250 including a feedback indication for the downlink transmission 230, in accordance with some embodiments of the present disclosure.

It should be noted that in FIG. 2, a block associated with scheduling information, a transmission or feedback information may schematically represent a set of time and frequency resources for transmitting or receiving the scheduling information, the transmission, or the feedback information, and thus may also be used to refer to the scheduling information, the transmission, or the feedback information per se, for convenience. In addition, it is understood that the sizes, the positions and the shapes of the blocks in FIG. 2 are only for example without suggesting any limitations. Embodiments of the present disclosure are equally applicable to blocks of any suitable sizes, any suitable positions and any suitable shapes, which correspond to any suitable sets of time and frequency resources.

As shown in FIG. 2, the network device 110 may transmit to the terminal device 120 the scheduling information (for example, a PDCCH) 210 which may schedule the transmission (for example, a PDSCH) 230 in a first slot 205. In addition, the scheduling information 210 can indicate a second slot 215 using a first offset 235 between the first slot 205 and the second slot 215. The second slot 215 may be a slot in which the terminal device 120 is to report the feedback information (for example, a HARQ-ACK codebook) 250 to the network device 110. In other words, the network device 110 indicates to the terminal device 120 that a feedback indication for the transmission 230 is to be included in the feedback information 250.

In some scenarios, the network device 110 may transmit to the terminal device 120 the further scheduling information (for example, a repetitive PDCCH) 220 which can schedule the repetitive downlink transmission (for example, a repetitive PDSCH) 240 in a third slot 225 between the first slot 205 and the second slot 215. In other words, the repetitive transmission 240 may be a repetition of the transmission 230. Therefore, the PDCCH 210 and the repetitive PDCCH 220 schedule different PDSCH occasions 230 and 240, which are used for transmitting same data or same transport blocks (TBs).

Additionally, the repetitive scheduling information 220 can also indicate the second slot 215 using a second offset 245 between the third slot 225 and the second slot 215. In other words, the network device 110 also indicates to the terminal device 120 that a feedback indication for the repetitive transmission 240 is to be included in the feedback information 250. Therefore, the feedbacks for the different PDSCH occasions 230 and 240 can be reported by the terminal device 120 to the network device 110 in a same set of PUCCH or PUSCH resources.

In some embodiments, the scheduling information 210 (for example, a first PDCCH) may be in a slot no later than the scheduling information 220 (for example, a second PDCCH) and the transmission 240 (for example, a second PDSCH scheduled by the scheduling information 220). In some embodiments, the scheduling information 210 (for example, the first PDCCH) may be in a slot no earlier than the scheduling information 220 (for example, the second PDCCH). In some embodiments, the scheduling information 220 (for example, the second PDCCH) may be no earlier than the transmission 230 (for example, a first PDSCH scheduled by the scheduling information 210). In some embodiments, the scheduling information 220 (for example, the second PDCCH) may be no later than the transmission 230 (for example, the first PDSCH scheduled by the scheduling information 210). In some embodiments, the scheduling information 210 (for example, the first PDCCH) may be in a slot no later than the scheduling information 220 (for example, the second PDCCH), and the transmission 230 (for example, the first PDSCH scheduled by 210) may be in a slot no later than the transmission 240 (for example, the second PDSCH scheduled by the scheduling information 220). In some embodiments, the scheduling information 210 (for example, the first PDCCH) may be in a slot no later than the scheduling information 220 (for example, the second PDCCH), and the transmission 230 (for example, the first PDSCH scheduled by the scheduling information 210) may be in a slot no earlier than the transmission 240 (for example, the second PDSCH scheduled by the scheduling information 220).

In some scenarios, the first offset 235 and the second offset 245 may be indicated by the network device using two K1 values from a set of K1 values, respectively. Each K1 value in the set of K1 values may represent a candidate offset between a slot associated with a transmission and a slot associated with a feedback indication for the transmission. Therefore, the first offset 235 may also be referred to as a K1 value 235, and the second offset 245 may also be referred to as a K1 value 245. In some embodiments, the network device 110 can configure the terminal device 120 with the set of K1 values via a radio resource control (RRC) message, a medium access control (MAC) control element (CE), or downlink control information (DCI). Alternatively, the set of K1 values can be preconfigured at both sides of the network device 110 and the terminal device 120.

In the example scenario of FIG. 2, the set of K1 values may cover different K1 values and some K1 values may not be needed for non-repetitive scheduling of non-repetitive transmissions. In other words, some K1 values may be used for same HARQ-ACK feedbacks for repetitive transmissions. For example, the K1 value 245 in FIG. 2 is used for a repetitive HARQ-ACK feedback for the repetitive transmission 240 of the transmission 230. However, according to the conventional design of feedback information (for example, a semi-static HARQ-ACK codebook), the feedback information reported by the terminal device 120 is to be generated based on the whole set of K1 values, even if some K1 values are only used for repeated scheduling of repetitive transmissions. For example, in FIG. 2, the K1 value 245 is only used for repeated PDSCH scheduling of the repetitive PDSCH 240, but conventional feedback information (for example, a semi-static HARQ-ACK codebook) is to reserve a feedback indication (for example, HARQ-ACK field) for the PDSCH occasion based on the K1 value 245.

Therefore, the reserved feedback indication (for example, HARQ-ACK field) in the conventional feedback information may cause unnecessary overhead of the feedback information, especially when the number of repetitive transmissions is great. In contrast, as further discussed below with reference to FIG. 3, in some embodiments of the present disclosure, the terminal device 120 can generate and report the feedback information 250 which includes a common feedback indication for the transmission 230 and the repetitive transmission 240, namely removing the feedback indications for repetitive transmissions, thereby eliminating unnecessary overhead of the feedback information 250.

Figure 3:
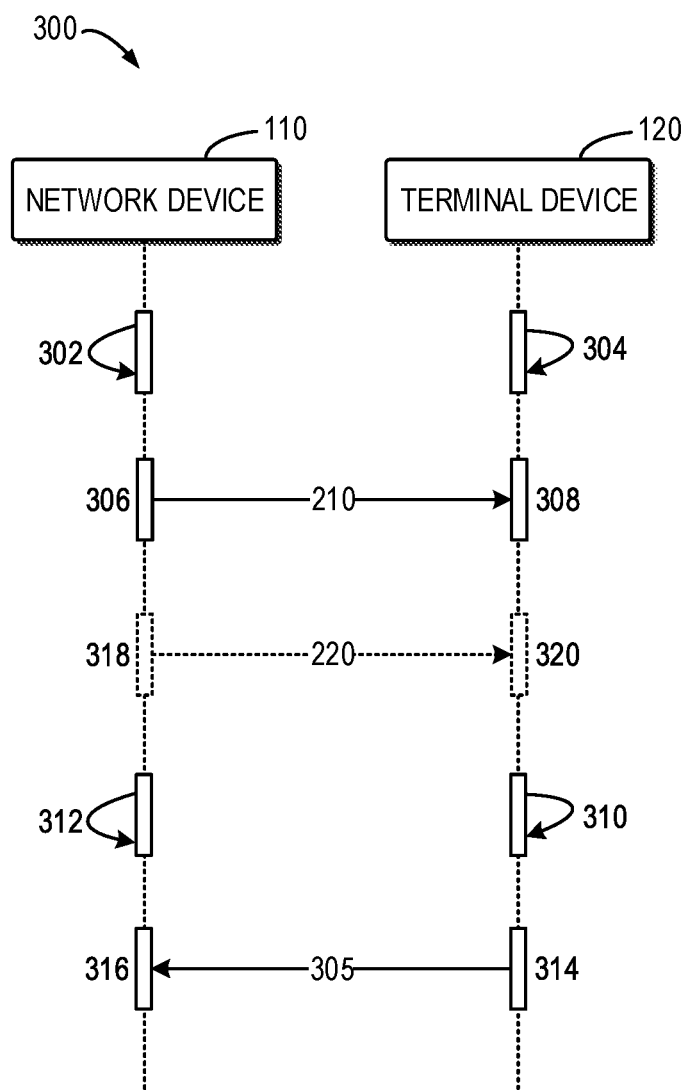
FIG. 3 illustrates an example communication process between a network device and a terminal device in accordance with some embodiments of the present disclosure.

FIG. 3 illustrates an example communication process 300 between the network device 110 and the terminal device 120 in accordance with some embodiments of the present disclosure. For the purpose of discussion, the communication process 300 will be described with reference to FIGS. 1 and 2. However, it would be appreciated that the communication process 300 may be equally applicable to any other communication scenarios where two communication devices communicate with each other.

As shown in FIG. 3, the network device 110 may determine 302 a first group of candidate offsets and a second group of candidate offsets. The first group of candidate offsets may be denoted as $\{Kg1\}=\{Kg1_1, Kg1_2, \ldots, Kg1_{m1}\}$ for ease of discussion, where m1 is an integer and $1 \leq m1 \leq 16$. However, in some other embodiments, the number m1 can be greater than 16. The first group of candidate offsets {Kg1} may be between a slot associated with a transmission of a first type from the network device 110 to the terminal device 120 and a slot associated with a feedback indication for the transmission of the first type. In addition, the second group of candidate offsets may be denoted as $\{Kg2\}=\{Kg2_1, Kg2_2, \ldots, Kg2_{n1}\}$ for ease of discussion, where n1 is an integer and $1 \leq n1 \leq 16$. However, in some other embodiments, the number n1 can be greater than 16. The second group of candidate offsets {Kg2} may be between a slot associated with a transmission of a second type from the network device 110 to the terminal device 120 and a slot associated with a feedback indication for the transmission of the second type. In some embodiments, $1 \leq m1+n1 \leq 16$.

In general, the transmission of the first type as used herein may be a transmission which needs a feedback indication reported by the terminal device 120 to the network device 110, and the transmission of the second type as used herein may be a transmission which does not need a feedback indication reported by the terminal device 120 to the network device 110. For example, the transmission of the first type may include a transmission without repetition or a first-time transmission followed by at least one repetitive transmission. That is, the transmission of the first type may be a non-repetitive transmission, namely, not a repetitive transmission of any previous transmission. In contrast, the transmission of the second type may include a repetitive transmission, namely, a repeated transmission of a previous transmission.

With such definitions of the first type of transmission and the second type of transmission, the non-repetitive transmissions and repetitive transmissions can be associated with separate groups of candidate offsets {Kg1} and {Kg2}, respectively. Therefore, as further described later in connection with a determining operation 310 of the terminal device 120, the terminal device 120 can exclude the second group of candidate offsets {Kg2} associated with repetitive transmissions in determining 310 a set of slots for which feedback information (for example, a HARQ-ACK codebook) 250 is to be transmitted to the network device 110, thereby reducing unnecessary overhead of the feedback information 250.

In some other embodiments, the transmission of the first type may be any other transmission which needs a feedback indication for any other possible reasons, and the transmission of the second type may be any other transmission which does not need a feedback indication for any other possible reasons. In addition, the network device 110 can determine 302 the first group of candidate offsets {Kg1} and the second group of candidate offsets {Kg2} in any suitable manner. For example, the two groups of candidate offsets {Kg1} and {Kg2} may be preconfigured at both sides of the network device 110 and the terminal device 120. As another example, the two groups of candidate offsets {Kg1} and {Kg2} can be determined by the network device 110 and signaled to the terminal device 110. As another example, the network device 110 may configure or indicate or signal the two groups of candidate offsets {Kg1} and {Kg2} to the terminal device 110, via at least one of a RRC message, a MAC-CE and a DCI.

At the other side of the communication process 300, the terminal device 120 may also obtain 304 the first group of candidate offsets {Kg1} and the second group of candidate offsets {Kg2} in any suitable manner. For example, the two groups of candidate offsets {Kg1} and {Kg2} may be preconfigured at both sides of the network device 110 and the terminal device 120. In some other embodiments, the first group of candidate offsets {Kg1} and the second group of candidate offsets {Kg2} can be configured by the network device 110, and the terminal device 120 may receive the first group of candidate offsets {Kg1} and the second group of candidate offsets {Kg2} from the network device 110, for example, via a RRC message, a MAC CE, or a DCI. Such embodiments will be further described later.

With reference to both FIGS. 2 and 3, the network device 110 may transmit 306 the scheduling information 210 to the terminal device 120. As described, the scheduling information 210 may be used for scheduling the transmission 230 in the first slot 205. The scheduling information 210 can comprise a target offset 235 (namely the afore-mentioned first offset 235) selected from the first group of candidate offsets {Kg1}. For example, the scheduling information 210 may include an index of the target offset 235 within the first group of candidate offsets {Kg1}. Together with the first slot 205, the target offset 235 can indicate the second slot 215 associated with a feedback indication for the transmission 230. In other words, the feedback indication for the transmission 230 is configured to be transmitted via the feedback information 250 to be reported in the second slot 215.

At the other side of the communication process 300, the terminal device 120 may receive 308 the scheduling information 210 from the network device 110, and then obtain the first slot 205 and the target offset 235 from the received scheduling information 210. After obtaining the first slot 205 and the target offset 235, the terminal device 120 can determine that the feedback indication for the transmission 230 is to be transmitted in the second slot 215. In some embodiments, because the number of slots for uplink transmissions may be less than the number of slots for downlink transmissions, for example, the terminal device 120 may not only transmit the feedback indication for the transmission 230 in the feedback information 250 to the network device 110 in the second slot 215, but may instead transmit a set of feedback indications 305 for a set of slots via the feedback information 250 to the network device 110. For example, this may be the case in which the terminal device 120 employs a semi-static HARQ-ACK codebook to generate the set of feedback indications 305, such as ACK/NACK indications. In particular, the set of feedback indications 305 may be generated for a set of downlink slots before the second slot 215 during which the set of feedback indications 305 is to be transmitted.

Accordingly, in some embodiments, the terminal device 120 may determine 310 the set of slots for which the set of feedback indications 305 is to be reported, based on the second slot 215 and the first group of candidate offsets $\{Kg1\}$. More particularly, the terminal device 120 can determine 310 each of the set of slots based on the second slot 215 and each candidate offset from the first group of candidate offsets $\{Kg1\}$. Since the first group of candidate offsets $\{Kg1\}$ is used for transmissions without repetition or first-time transmissions with repetition, the set of slots determined 310 by the terminal device 120 may be the slots associated with non-repetitive transmissions. At the other side of the communication process 300, the network device 110 may also determine 312 the set of slots for which the set of feedback indications 305 is to be reported, based on the second slot 215 and the first group of candidate offsets $\{Kg1\}$ in a similar way. In the following, a specific example showing how the set of slots are determined will be further described with reference to FIG. 4.

Figure 4:
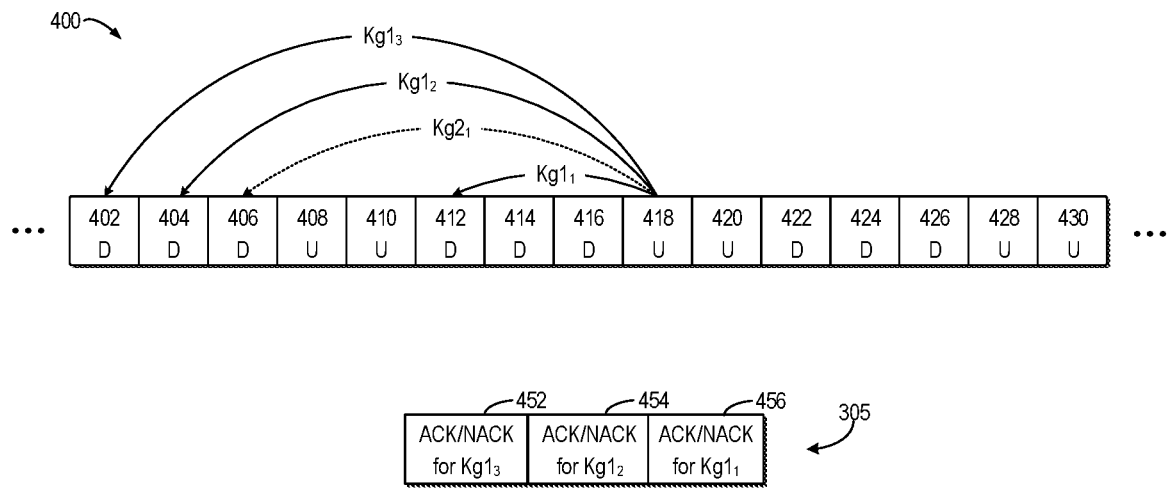
FIG. 4 illustrates an example showing how a terminal device or a network device determines a set of slots for which a set of feedback indications is to be transmitted from the terminal device to the network device, in accordance with some embodiments of the present disclosure.

FIG. 4 illustrates an example 400 showing how the terminal device 120 or the network device 110 determines a set of slots 402, 404 and 412 for which a set of feedback indications 305 is to be transmitted from the terminal device 120 to the network device 110, in accordance with some embodiments of the present disclosure. In FIG. 4, fifteen (15) slots 402 to 430 are shown, in which slots 402, 404, 406, 412, 414, 416, 422, 424, and 426 (denoted as "D") are slots for downlink transmissions from the network device 110 to the terminal device 120, whereas slots 408, 410, 418, 420, 428, and 430 (denoted as "U") are slots for uplink transmissions from the terminal device 120 to the network device 110. It is to be understood that the number of the slots, the purposes of the slots, and the arrangement of the slots as shown in FIG. 4 are only for example without suggesting any limitations. Embodiments of the present disclosure are equally applicable to any suitable number of the slots, any suitable purposes of the slots, and any suitable arrangement of the slots.

With reference to FIGS. 2 to 4 and without loss of generality, the slot 404 may be taken as an example of the first slot 205 as discussed above, the slot 418 may be taken as an example of the second slot 215 as discussed above, and the slot 406 may be taken as an example of the third slot 225 as discussed above. Further, it is assumed that the terminal device 120 or the network device 110 obtains the first group of candidate offsets $\{Kg1\}$ as $\{Kg1_3=8, Kg1_2=7, Kg1_1=3\}$ and the second group of candidate offsets $\{Kg2\}$ as $\{Kg2_1=6\}$. It is to be appreciated that the number of the Kg1 values in the first group of candidate offsets $\{Kg1\}$, the number of the Kg2 values in the second group of candidate offsets $\{Kg2\}$, and the specific values of the Kg1 values and the Kg2 values are only for example without suggesting any limitations. Embodiments of the present disclosure are equally applicable to the first group of candidate offsets $\{Kg1\}$ including any suitable number of Kg1 values, the second group of candidate offsets $\{Kg2\}$ including any suitable number of Kg2 values, and any specific values of the Kg1 values and the Kg2 values.

Therefore, based on the second slot 418 and the first group of candidate offsets $\{Kg1_3=8, Kg1_2=7, Kg1_1=3\}$, the terminal device 120 or the network device 110 can determine the set of slots as slots 402, 404, and 412. Then, the terminal device 120 can generate the set of feedback indications 305 for the set of slots 402, 404, and 412. It can be seen that the set of slots 402, 404, and 412 for which feedback indications are to be reported does not include the slot 406 associated with the second group of candidate offsets $\{Kg2_1=6\}$. For example, a HARQ-ACK codebook generated by the terminal device 120 for reporting in the second slot 418 does not include a HARQ-ACK field for the third slot 406.

As mentioned, the transmission 240 in the third slot 406 is a repetitive transmission of the transmission 230 in the first slot 404. Although the further scheduling information 220 also indicates the second slot 418 using a target offset (namely, the second offset 245 in FIG. 2 and $Kg2_1=6$ in FIG. 4) selected form the second group of candidate offsets $\{Kg2\}$, the terminal device 120 can prevent from generating a repetitive feedback indication for the repetitive transmission 240 by not employing the second group of candidate offsets $\{Kg2\}$ in determining 310 the set of slots for which the set of feedback indications 305 is to be reported.

Referring to both FIGS. 3 and 4, after determining 310 the set of slots 402, 404, and 412, the terminal device 120 may transmit 314 the set of feedback indications 305 (for example, via the feedback information 250) for the set of slots 402, 404, and 412 to the network device 110 in the second slot 418. In the example of FIG. 4, the set of feedback indications 305 may include a feedback indication (for example, a HARQ-ACK field) 452 for the slot 402, a feedback indication (for example, a HARQ-ACK field) 454 for the first slot 404, and a feedback indication (for example, a HARQ-ACK field) 456 for the slot 412. It can be seen that the set of feedback indications 305 reported to the network device 110 does not include a feedback indication for the third slot 406, thereby eliminating unnecessary overhead of the set of feedback indications 305.

At the other side of the communication process 300, the network device 110 may receive 316 the set of feedback indications 305 for the set of slots 402, 404, and 412 from the terminal device 120 in the second slot 418. Through the communication process 300, in case the network device 110 repeatedly transmits downlink scheduling information (for example, a PDCCH) and/or a downlink data transmission (for example, a PDSCH) to the terminal device 120, the overhead of feedback information (for example, a HARQ-ACK codebook) reported by the terminal device 110 to the network device 120 can be reduced, especially when the number of repetitive downlink scheduling information (for example, PDCCH) transmissions and/or downlink data transmissions (for example, PDSCH) is great.

It should be noted that the above embodiments discussed in connection with FIG. 3 can be applied to a scenario in which there is no scheduling information for a repetitive downlink transmission, namely, there are only non-repetitive transmissions. In some other embodiments, with reference to both FIGS. 2 and 3, the network device 110 may transmit 318 further scheduling information 220 to the terminal device 120. The further scheduling information 220 can be used for scheduling a repetitive transmission 240 of the transmission 230 in the third slot 225 between the first slot 205 and the second slot 215. The further scheduling information 220 may comprise a further target offset (namely the second offset 245 in FIG. 2) selected from the second group of candidate offsets {Kg2} to indicate the second slot 215. Accordingly, the terminal device 120 may receive 320 the further scheduling information 220 from the network device 110. In this way, with the second group of candidate offsets {Kg2}, the network device 110 can effectively indicate the same feedback slot 215 for the repetitive transmission 240 and the first-time transmission 230.

As mentioned above in connection with the obtaining operation 304 of the terminal device 120, if the first group of candidate offsets {Kg1} and the second group of candidate offsets {Kg2} are configured by the network device 110, then the terminal device 120 may receive the first group of candidate offsets {Kg1} and the second group of candidate offsets {Kg2} from the network device 110, for example, via a RRC message, MAC CE, or DCI. In particular, as an example, the network device 110 can transmit a first set of candidate offsets and a second set of candidate offsets to the terminal device 120. As used herein, the first set of candidate offsets may be denoted as $\{K1\}=\{K1_1, K1_2, \ldots, K1_{m2}\}$, where m2 is an integer and $1 \le m2 \le 16$. In addition, the second set of candidate offsets may be denoted as $\{Ka\}=\{Ka_1, Ka_2, \ldots, Ka_{n2}\}$, where n2 is an integer and $1 \le n2 \le 16$. However, in some other embodiments, the numbers m2 and n2 can be greater than 16. In some embodiments, $1 \le m2+n2 \le 16$.

In some embodiments, the first set of candidate offsets {K1} may be defined for transmissions of the first type, for example, non-repetitive PDCCHs including PDCCHs without repetition and first-time PDCCHs in case of PDCCH repetitions. In contrast, the second set of candidate offsets {Ka} may be defined for transmissions of the second type, for example, PDCCH repetitions except the first-time PDCCHs. In other words, the first set of candidate offsets {K1} may be same as the first group of candidate offsets {Kg1}, and the second set of candidate offsets {Ka} may be same as the second group of candidate offsets {Kg2}. In this way, the terminal device 120 can directly receive the first group of candidate offsets {Kg1} and the second group of candidate offsets {Kg2}, thereby reducing the processing complexity of the terminal device 120 for obtaining the first group of candidate offsets {Kg1} and the second group of candidate offsets {Kg2}.

In some embodiments, at least one value in the second set of candidate offsets {Ka} is associated with at least one value in the first set of candidate offsets {K1}, and the associated value in the first set of candidate offsets {K1} may be the K1 value associated with a feedback indication for a PDSCH scheduled by a first-time PDCCH. In some embodiments, a value in the second set of candidate offsets {Ka} may be not greater than the associated value in the first set of candidate offsets {K1}. In some embodiments, the first set of candidate offsets {K1} and/or the second set of candidate offsets {Ka} may be configured to a search space and/or a CORESET and/or an active bandwidth part (BWP) for timing of HARQ-ACK feedbacks for PDSCHs scheduled by repeatedly transmitted PDCCHs.

In addition, the network device 110 can transmit an indication to the terminal device 120 to inform that the first set of candidate offsets {K1} is the first group of candidate offsets {Kg1}. Similarly, the network device 110 can also transmit an indication to the terminal device 120 to inform that the second set of candidate offsets {Ka} is the second group of candidate offsets {Kg2}. Although separate indications are described herein, this is only for example without suggesting any limitations. In some other embodiments, the two indications may be transmitted to the terminal device 120 in one message or be transmitted together with the first set of candidate offsets {K1} and the second set of candidate offsets {Ka}. In some further embodiments, the first set of candidate offsets {K1} and the second set of candidate offsets {Ka} and their relations to the first group of candidate offsets {Kg1} and the second group of candidate offsets {Kg2} may be predefined or preconfigured at both sides of the network device 110 and the terminal device 120.

At the other side of the communication process 300, in obtaining 304 the first group of candidate offsets {Kg1} and the second group of candidate offsets {Kg2}, the terminal device 120 may receive the first set of candidate offsets {K1} and the second set of candidate offsets {Ka} from the network device 110. Then, based on the indication received from the network device 110 or a predefined configuration, the terminal device 120 can determine the first set of candidate offsets {K1} as the first group of candidate offsets {Kg1}, and determine the second set of candidate offsets {Ka} as the second group of candidate offsets {Kg2}.

As another example of informing the terminal device 120 of the first group of candidate offsets {Kg1} and the second group of candidate offsets {Kg2}, the network device 110 can analogously transmit a first set of candidate offsets {K1} and a second set of candidate offsets {Ka} to the terminal device 120. As used herein, the first set of candidate offsets may be denoted as $\{K1\}=\{K1_1, K1_2, \ldots, K1_{m2}\}$, where m2 is an integer and $1 \le m2 \le 16$. In addition, the second set of candidate offsets may be denoted as $\{Ka\}=\{K_{a1}, K_{a2}, \ldots, Ka_{n2}\}$, where n2 is an integer and $1 \le n3 \le 16$. However, in some other embodiments, the numbers m2 and n2 can be greater than 16. In some embodiments, $1 \le m2+n2 \le 16$.

Different from the previous example, the first set of candidate offsets {K1} may be defined for transmissions without repetition, for example, including PDCCHs without repetition and excluding first-time PDCCHs in case of PDCCH repetitions. In contrast, the second set of candidate offsets {Ka} can be defined for transmissions with repetition, for example, including first-time PDCCHs and repetitive PDCCHs in case of PDCCH repetitions. In other words, the first group of candidate offsets {Kg1} may include the first set of candidate offsets {K1} and a part of the second set of candidate offsets {Ka}, and the second group of candidate offsets {Kg2} may include another part of the second set of candidate offsets {Ka}. In this way, the definitions and allocations of the first group of candidate offsets {Kg1} and the second group of candidate offsets {Kg2} can be simplified. In addition, the transmissions without repetition (usually associated with a less important service) and the transmissions with repetition (usually associated with an important service) can be scheduled using separate sets of candidate offsets.

More particularly, in some embodiments, a subset of values in the second set of candidate offsets {Ka} may be applicable for a first-time PDCCH, and other values in the second set of candidate offsets {Ka} may be used for the repetitive PDCCHs following the first-time PDCCH. For example, the last value or the first value in the second set of candidate offsets {Ka} may be applicable for the first-time PDCCH. In some embodiments, values in the second set of candidate offsets {Ka} are continuous values. In some embodiments, the first set of candidate offsets {K1} and/or the second set of candidate offsets {Ka} may be configured to a search space and/or a CORESET and/or an active BWP for timing of HARQ-ACK feedbacks for PDSCHs scheduled by repeatedly transmitted PDCCHs. For a semi-static HARQ-ACK codebook, a related HARQ-ACK field may be based on only a subset of values in the second set of candidate offsets {Ka}, which subset is applicable for a first-time PDCCH, for example, based on only the last value or the first value in the second set of candidate offsets {Ka}.

In addition, the network device 110 can transmit an indication to the terminal device 120 to inform that a combination of the first set of candidate offsets {K1} and a part of the second set of candidate offsets {Ka} for first-time transmissions is the first group of candidate offsets {Kg1}. Similarly, the network device 110 can also transmit an indication to the terminal device 120 to inform that a further part of the second set of candidate offsets {Ka} is the second group of candidate offsets {Kg2}. Although separate indications are described herein, this is only for example without suggesting any limitations. In some other embodiments, the two indications may be transmitted to the terminal device 120 in one message or be transmitted together with the first set of candidate offsets {K1} and the second set of candidate offsets {Ka}. In some further embodiments, the first set of candidate offsets {K1} and the second set of candidate offsets {Ka} and their relations to the first group of candidate offsets {Kg1} and the second group of candidate offsets {Kg2} may be predefined or preconfigured at both sides of the network device 110 and the terminal device 120.

At the other side of the communication process 300, in obtaining 304 the first group of candidate offsets {Kg1} and the second group of candidate offsets {Kg2}, the terminal device 120 may receive the first set of candidate offsets {K1} and the second set of candidate offsets {Ka} from the network device 110. Then, based on the indication received from the network device 110 or a predefined configuration, the terminal device 120 can determine a combination of the first set of candidate offsets {K1} and a part of the second set of candidate offsets {Ka} for first-time transmissions as the first group of candidate offsets {Kg1}, and determine a further part of the second set of candidate offsets {Ka} as the second group of candidate offsets {Kg2}.

Figure 5:
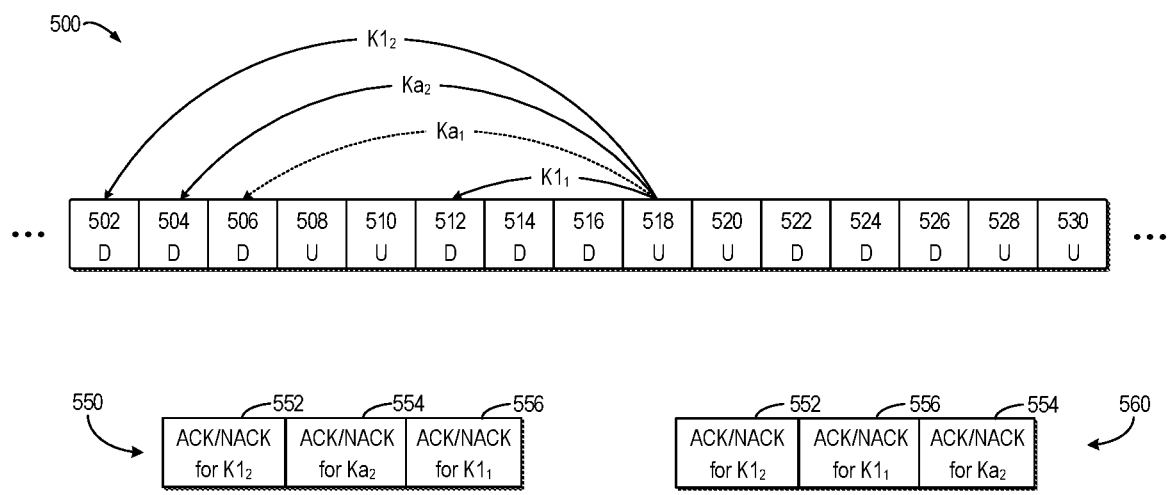
FIG. 5 illustrates an example showing how a terminal device arranges a set of feedback indications in accordance with some embodiments of the present disclosure.

FIG. 5 illustrates an example 500 showing how the terminal device 120 arranges a set of feedback indications 552, 554 and 556 in accordance with some embodiments of the present disclosure. In FIG. 5, fifteen (15) slots 502 to 530 are shown, in which slots 502, 504, 506, 512, 514, 516, 522, 524, and 526 (denoted as "D") are slots for downlink transmissions from the network device 110 to the terminal device 120, whereas slots 508, 510, 518, 520, 528, and 530 (denoted as "U") are slots for uplink transmissions from the terminal device 120 to the network device 110. It is to be understood that the number of the slots, the purposes of the slots, and the arrangement of the slots as shown in FIG. 5 are only for example without suggesting any limitations. Embodiments of the present disclosure are equally applicable to any suitable number of the slots, any suitable purposes of the slots, and any suitable arrangement of the slots.

With reference to FIGS. 2, 3, and 5 and without loss of generality, the slot 504 may be taken as an example of the first slot 205 as discussed above in connection with FIG. 2, the slot 518 may be taken as an example of the second slot 215 as discussed above in connection with FIG. 2, and the slot 506 may be taken as an example of the third slot 225 as discussed above in connection with FIG. 2. Further, it is assumed that the terminal device 120 or the network device 110 determines the first set of candidate offsets {K1} as {K1$_2$=8, K1$_1$=3} and the second set of candidate offsets {Ka} as {Ka$_2$=7, Ka$_1$=6}, in which the Ka$_2$=7 is configured for the first-time transmission 230 in the first slot 504 and the Ka$_1$=6 is configured for the repetitive transmission 240 in the third slot 506.

It is to be appreciated that the number of the K1 values in the first set of candidate offsets {K1}, the number of the Ka values in the second set of candidate offsets {Ka}, and the specific values of the K1 values and the Ka values are only for example without suggesting any limitations. Embodiments of the present disclosure are equally applicable to the first set of candidate offsets {K1} including any suitable number of K1 values, the second set of candidate offsets {Ka} including any suitable number of Ka values, and any specific values of the K1 values and the Ka values.

Accordingly, the terminal device 120 can determine the first group of candidate offsets {Kg1} as a combination of the first set of candidate offsets {K1} and a part of the second set of candidate offsets {Ka}, namely {Ka$_2$}, and determine the second group of candidate offsets {Kg2} as another part of the second set of candidate offsets {Ka}, namely {Ka$^1$}. Based on the second slot 518 and the first group of candidate offsets {Kg1}, the terminal device 120 can determine to transmit the set of feedback indications 552, 554, and 556 for a set of slots 502, 504, and 512, in which the slots 502 and 504 are associated with the first set of candidate offsets {K1} and the slot 504 is associated with the second set of candidate offsets {Ka}. Since the set of slots 502, 504, and 512 are associated with different sets of candidate offsets {K1} and {Ka}, there may be various possible options for the terminal device 120 to arrange the set of feedback indications 552, 554, and 556 for the set of slots 502, 504, and 512.

As one possible option, the terminal device 120 can arrange the set of feedback indications 552, 554, and 556 based on magnitudes of candidate offsets in the first set of candidate offsets {K1} and the part of the second set of candidate offsets {Ka} for first-time transmissions. In this way, the order of the set of feedback indications 552, 554, and 556 can be consistent with the order of the associated set of slots 502, 504, and 512 in time domain, thereby simplifying the determination of the individual association relationships between the set of feedback indications 552, 554, and 556 and the set of slots 502, 504, and 512.

For example, in FIG. 5, the terminal device 120 may determine that the magnitudes of candidate offsets are K1$_2$=8, Ka$_2$=7, K1$_1$=3, and then can generate the set of feedback indications 550 with a sequence of the feedback indication 552 for the slot 502, followed by the feedback indication 554 for the slot 504, and followed by the feedback indication 556 for the slot 512. It is noted that the set of feedback indications 550 in a descending order of the magnitudes of candidate offsets is only for example without suggesting any limitation. In other embodiments, the order of the set of feedback indications 552, 554, and 556 can be reversed, namely, in an ascending order of the magnitudes of candidate offsets. At the other side of the communication process 300, the network device 110 may determine that the set of feedback indications 550 is arranged based on the magnitudes of candidate offsets in the first set of candidate offsets {K1} and the part of the second set of candidate offsets {Ka} for first-time transmissions.

Alternatively, as another possible option, the terminal device 120 can arrange the set of feedback indications 552, 554 and 556 by concatenating feedback indications associated with the first set of candidate offsets {K1} and feedback indications associated with the part of the second set of candidate offsets {Ka} for first-time transmissions. In this way, the process of arranging the set of feedback indications 552, 554 and 556 can be simplified, since there is no need to compare the magnitudes of candidate offsets in different sets of candidate offsets {K1} and {Ka}.

For example, in FIG. 5, the terminal device 120 may determine that feedback indications 552 and 556 are associated with the first set of candidate offsets {K1}, and feedback indications 554 is associated with the second set of candidate offsets {Ka}. Then, the terminal device 120 can generate the set of feedback indications 560 with a sequence of the feedback indication 552 for the slot 502, followed by the feedback indication 556 for the slot 512, and followed by the feedback indication 554 for the slot 504.

It is noted that the set of feedback indications 560 in an order of the candidate offsets associated with the first set of candidate offsets {K1} followed by the candidate offsets associated with the second set of candidate offsets {Ka} is only for example without suggesting any limitation. In other embodiments, the order of the set of feedback indications 560 can be reversed, namely, in an order of the candidate offsets associated with the second set of candidate offsets {Ka} followed by the candidate offsets associated with the first set of candidate offsets {K1}. At the other side of the communication process 300, the network device 110 may determine that the set of feedback indications 560 is arranged by concatenating the feedback indications associated with the first set of candidate offsets {K1} and the feedback indications associated with the part of the second set of candidate offsets {Ka} for first-time transmissions.

In some embodiments, instead of transmitting to the terminal device 210 two sets of candidate offsets {K1} and {Ka}, the network device 110 can transmit one set of candidate offsets {K1} to the terminal device 120. As used herein, the set of candidate offsets {K1} may be denoted as $\{K1\}=\{K1_1, K1_2, \ldots, K1_{m2}\}$, where m2 is an integer and $1 \leq m2 \leq 16$. However, in some other embodiments, the number m2 can be greater than 16. For example, the set of candidate offsets {K1} may be configured for CORESETs in a BWP. In particular, the set of candidate offsets {K1} may be defined for both transmissions of the first type and transmissions of the second type. In other words, the first group of candidate offsets {Kg1} may be a part (namely, a subset) of the set of candidate offsets {K1}, and the second group of candidate offsets {Kg2} may be another part of the set of candidate offsets {K1}. As such, the number of the configured set of candidate offsets can be maintained as less as only one, thereby reducing the potential signaling overhead for indicating two different sets of candidate offsets {K1} and {Ka}, and being more compatible with the existing specifications related to the candidate offsets.

Accordingly, the network device 110 can transmit to the terminal device 120 to inform that a part of the set of candidate offsets {K1} for transmissions of the first type is the first group of candidate offsets {Kg1}. Similarly, the network device 110 can also transmit an indication to the terminal device 120 to inform that a further part of the set of candidate offsets {K1} is the second group of candidate offsets {Kg2}. Although separate indications are described herein, this is only for example without suggesting any limitations. In some other embodiments, the two indications may be transmitted to the terminal device 120 in one message or be transmitted together with the set of candidate offsets {K1}. In some further embodiments, the set of candidate offsets {K1} and its relations to the first group of candidate offsets {Kg1} and the second group of candidate offsets {Kg2} may be predefined or preconfigured at both sides of the network device 110 and the terminal device 120.

At the other side of the communication process 300, in obtaining 304 the first group of candidate offsets {Kg1} and the second group of candidate offsets {Kg2}, the terminal device 120 may receive the set of candidate offsets {K1} from the network device 110. Then, based on the indication received from the network device 110 or a predefined configuration, the terminal device 120 can determine a part of the set of candidate offsets {K1} for transmissions of the first type as the first group of candidate offsets {Kg1}, and determine a further part of the set of candidate offsets {K1} as the second group of candidate offsets {Kg2}.

In some embodiments, the first group of candidate offsets {Kg1} and the second group of candidate offsets {Kg2} preconfigured or configured at both sides of the network device 110 and the terminal device 120 may have one or more common (or same) candidate offsets. In this event, for a common candidate offset between the first group of candidate offsets {Kg1} and the second group of candidate offsets {Kg2}, the network device 100 may use the common candidate offset in scheduling a transmission of the first type and also can use the common candidate offset in scheduling a transmission of the second type. Therefore, the terminal device 120 may need to transmit a feedback indication for a slot determined based on a feedback slot and the common candidate offset, because there is a possibility that the transmission in the determined slot is a non-repetitive transmission.

Accordingly, referring back to FIG. 3, in determining 310 the set of slots for which the set of feedback indications are to be transmitted in the second slot 215, if there is a common candidate offset between the first group of candidate offsets {Kg1} and the second group of candidate offsets {Kg2}, the terminal device 120 may determine a slot based on the second slot 215 and the common candidate offset. In other words, the common candidate offset may be used for generating a HARQ-ACK codebook. As such, the terminal device 120 can ensure that feedback indications for the non-repetitive transmissions are reported to the network device 110, thereby improving reliability of the non-repetitive transmissions. At the other side of the communication process 300, in determining 312 the set of slots for which the set of feedback indications are to be received in the second slot 215, the network device 110 may also determine the slot based on the second slot 215 and the common candidate offset.

Hereinbefore, some embodiments are described in which two separate groups of candidate offsets {Kg1} and {Kg2} are configured or preconfigured at both sides of the network device 110 and the terminal device 120 to eliminate unnecessary overhead of feedback information reported by the terminal device 120 to the network device 110. Hereinafter, some other embodiments will be described with reference to FIGS. 6 and 7, in which the network device 110 can transmit to the terminal device 120 first scheduling information and second scheduling information to schedule a first transmission in a first slot and a second transmission (which is a repetition of the first transmission) in a second slot, respectively, and the first scheduling information and the second scheduling information indicate a same feedback slot using a first offset and a second offset, respectively.

In these embodiments, the network device 110 and the terminal device 120 can select one of the first offset and the second offset according to a same predefined rule, and then determine a position of a feedback indication for the first transmission in a set of feedback indications to be reported by the terminal device 120 to the network device 110 in the feedback slot. In this way, ambiguity of the position of the feedback indication in the set of feedback indications can be eliminated at both sides of the network device 110 and the terminal device 120.

Figure 6:
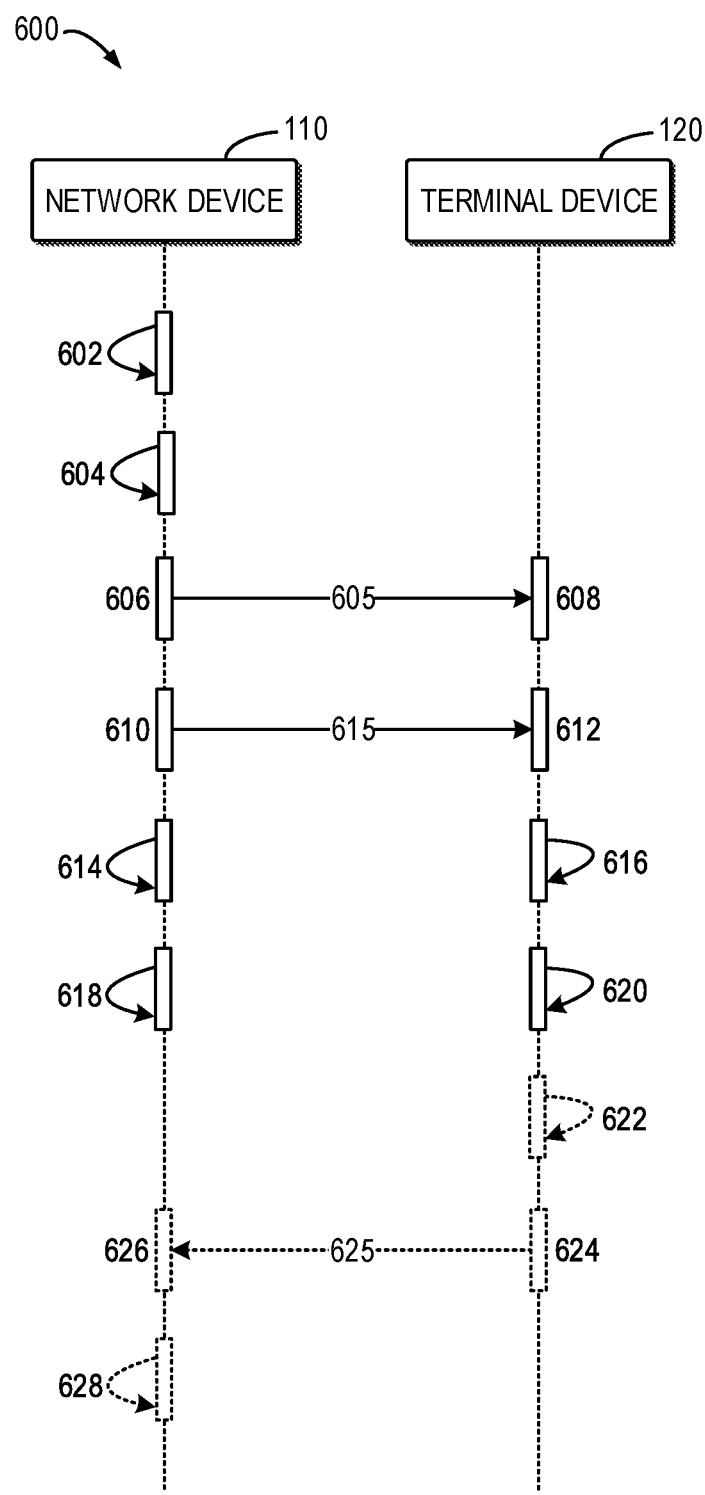
FIG. 6 illustrates an example communication process between a network device and a terminal device in accordance with some embodiments of the present disclosure.

FIG. 6 illustrates an example communication process 600 between the network device 110 and the terminal device 120 in accordance with some embodiments of the present disclosure. For the purpose of discussion, the communication process 600 will be described with reference to FIGS. 1 and 7. However, it would be appreciated that the communication process 600 may be equally applicable to any other communication scenarios where two communication devices communicate with each other.

Figure 7:
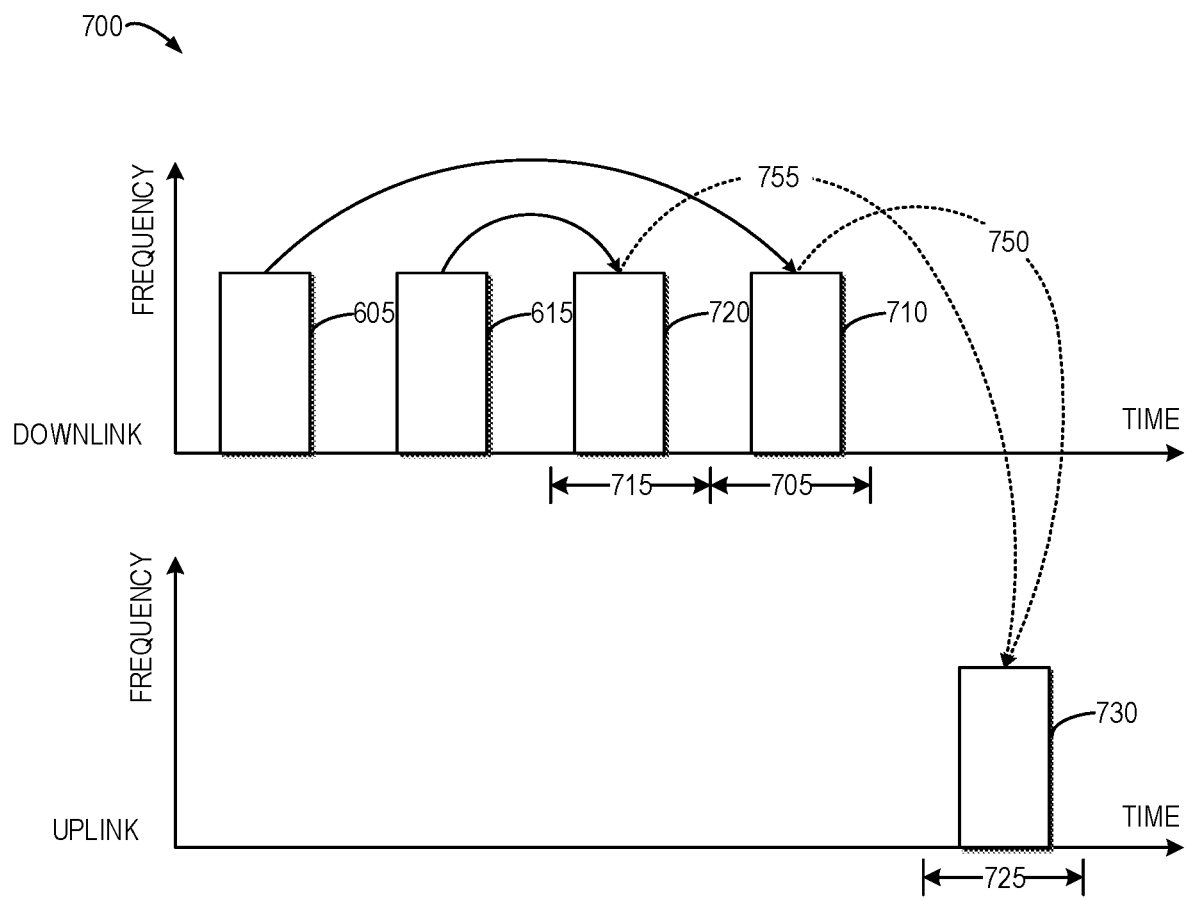
FIG. 7 illustrates an example scenario in which a network device transmits first scheduling information to a terminal device to schedule a first transmission and also transmits second scheduling information to the terminal device to schedule a second transmission which is a repetition of the first transmission, and the terminal device transmits a feedback indication for the downlink transmission to the network device, in accordance with some embodiments of the present disclosure.

FIG. 7 illustrates an example scenario 700 in which the network device 110 transmits first scheduling information 605 to the terminal device 120 to schedule a first transmission 710 and also transmits second scheduling information 615 to the terminal device 120 to schedule a second downlink transmission 720 which is a repetition of the first transmission 710, and the terminal device 120 transmits a feedback indication 730 for the first transmission 710 to the network device 110, in accordance with some embodiments of the present disclosure.

With reference to both FIGS. 6 and 7, the network device 110 may determine 602 a first offset 750 between a first slot 705 associated with the first transmission 710 from the network device 110 to the terminal device 120 and a feedback slot 725 associated with the feedback indication 730 for the first transmission 720. In a similar manner, the network device 110 may determine 604 a second offset 755 between a second slot 715 associated with the second transmission 720 and the feedback slot 725.

Then, the network device 110 may transmit 606 the first scheduling information 605 to the terminal device 120. The first scheduling information 605 may be used for scheduling the first transmission 710 in the first slot 705 and can indicate the first offset 750. Accordingly, the terminal device 120 may receive 608 the first scheduling information 605 from the network device 110. As such, the network device 110 can inform the terminal device 120 of the first offset 750 associated with the first scheduling information 605 and the first transmission 710.

Analogously, the network device 110 may transmit 610 the second scheduling information 615 to the terminal device 120. The second scheduling information 615 may be used for scheduling the second transmission 720 in the second slot 715 and can indicate the second offset 755. Accordingly, the terminal device 120 may receive 612 the second scheduling information 615 from the network device 110. As such, the network device 110 can inform the terminal device 120 of the second offset 755 associated with the second scheduling information 615 and the second transmission 720.

As shown in FIG. 7, in some embodiments, although the first scheduling information 605 is prior to the second scheduling information 615, the first transmission 710 scheduled by the first scheduling information 605 may be after the second transmission 720 scheduled by the second scheduling information 615. However, although FIG. 7 schematically depicts that the first transmission 710 is after the second transmission 720 in time domain, it is understood that such a depiction is only for example without suggesting any limitation. In other embodiments, the first transmission 710 may alternatively be prior to the second transmission 720 in time domain.

As mentioned, although the network device 110 may instruct the terminal device 120 to report feedback indications for the first transmission 710 and the second transmission 720 in the same feedback slot 725, the terminal device 120 can transmit a common feedback indication for both the first transmission 710 and the second transmission 720 in the same feedback slot 725, because the second transmission 720 is a repetitive transmission of the first transmission 710. In addition, it is noted that a position of the common feedback indication 730 among a set of feedback indications 625 to be reported in the feedback slot 725 may need to be determined based on an indicated offset (for example, a K1 value) associated with the transmission and the feedback slot 725. However, the first offset 750 indicated in the first scheduling information 605 is different from the second offset 755 indicated in the second scheduling information 615.

Therefore, in order to determine the position of the common feedback indication 730 in the set of feedback indications 625, the terminal device 120 and the network device 110 may need to select one of the first offset 750 and the second offset 755 based on a same predefined rule, so that there is no ambiguity of the position of the common feedback indication 730 at both sides of the terminal device 120 and the network device 110. In some embodiments, since the scheduling time point and the transmitting time point of the first transmission 710 are different from that of the second transmission 720, that is, the timing associated with the first transmission 710 and the timing associated with the second transmission 720 are different, the terminal device 120 may select 616 one of the first offset 750 and the second offset 755 based on a comparison between first timing associated with the first transmission 710 and second timing associated with the second transmission 720. In a similar way, the network device 110 may select 614 one of the first offset 750 and the second offset 755 based on the comparison.

For example, the terminal device 120 may determine that the first scheduling information 605 associated with the first transmission 710 is prior to the second scheduling information 615 associated with the second transmission 720. Then, the terminal device 120 may select the first offset 750 from the first offset 750 and the second offset 755, since the first offset 750 is associated with the first scheduling information 605. In an analogous manner, the network device 110 may also determine that the first scheduling information 605 associated with the first transmission 710 is prior to the second scheduling information 615 associated with the second transmission 720, and then select the first offset 750 from the first offset 750 and the second offset 755. In this way, the offset associated with the transmission scheduled earlier can be used by both the network device 110 and the terminal device 120 to determine the position of the feedback indication 730 in the set of feedback indications 625, thereby eliminating the ambiguity of the position of the feedback indication 730 at both sides of the network device 110 and the terminal device 120.

As another example, the terminal device 120 may determine a preceding transmission 720 from the first transmission 710 and the second transmission 720. Then, the terminal device 120 may select the second offset 755 from the first offset 750 and the second offset 755, since the second offset 755 is associated with the preceding transmission 720. In a similar manner, the network device 110 may determine a preceding transmission 720 from the first transmission 710 and the second transmission 720. Then, from the first offset 710 and the second offset 720, the network device 110 may also select the second offset 755 associated with the preceding transmission 720. In this way, the offset associated with the transmission transmitted or received earlier can be used by both the network device 110 and the terminal device 120 to determine the position of the feedback indication in the set of feedback indications 625, thereby eliminating the ambiguity of the position of the feedback indication at both sides of the network device 110 and the terminal device 120.

Based on the selected one of the first offset 750 and the second offset 755, the terminal device 120 may determine 620 the position of the feedback indication 730 in the set of feedback indications 625 to be transmitted in the feedback slot 725 to the network device 110. For example, the terminal device 120 can compare the selected offset with other K1 values for determining the set of feedback indications 625, and then place the feedback indication 730 in a proper position in the feedback indications 625. In a similar way, based on the selected one of the first offset 750 and the second offset 755, the network device 110 may also determine 618 the position of the feedback indication 730 in the set of feedback indications 625 to be received in the feedback slot 725 from the terminal device 120.

In some embodiments, after determining 620 the position of the feedback indication 730 in the set of feedback indications 625, the terminal device 120 may generate 622 the set of feedback indications 625 based on the determined position of the feedback indication 730 in the set of feedback indications 625. Then, the terminal device 120 may transmit 624 the set of feedback indications 625 to the network device 110. At the other side of the communication process 600, the network device 110 may receive 626 the set of feedback indications 625 from the terminal device 120. Then, the network device 110 may obtain 628 the feedback indication 730 at the determined position in the set of feedback indications 625. In this way, the common feedback indication 730 for both the first transmission 710 and the second transmission 720 can be unambiguously reported by the terminal device 120 to the network device 110 among the set of feedback indications 650.

Hereinbefore, some embodiments are described in which the network device 110 and the terminal device 120 can use a same rule to select one of a first offset associated with a first transmission and a second offset associated with a second transmission (which is a repetitive transmission of the first transmission), and thus may determine a same position of a common feedback indication for the first transmission and the second transmission in a set of feedback indications to be transmitted or received.

Hereinafter, some other embodiments will be described in which a real or actual feedback indication for a transmission may be reported in a feedback slot from the terminal device 120 to the network device 110 in case the transmission is configured with repetitive transmissions of a feedback indication, even if the feedback indication for the transmission is not configured to be reported in this feedback slot. For example, it is assumed that the terminal device 120 generates a semi-static HARQ-ACK codebook based on a set of K1 values. For a slot for transmitting HARQ-ACK feedback indications to the network device 110, if a PDSCH occasion is in the set of K1 values while a feedback indication of the PDSCH occasion is not indicated in the slot, then real value(s) of ACK or NACK for the PDSCH can be reported, in case the PDSCH is configured to be repeated or the PDSCH is scheduled by repeated PDCCHs. Such embodiments are described in further details below with reference to FIGS. 8 and 9.

Figure 8:
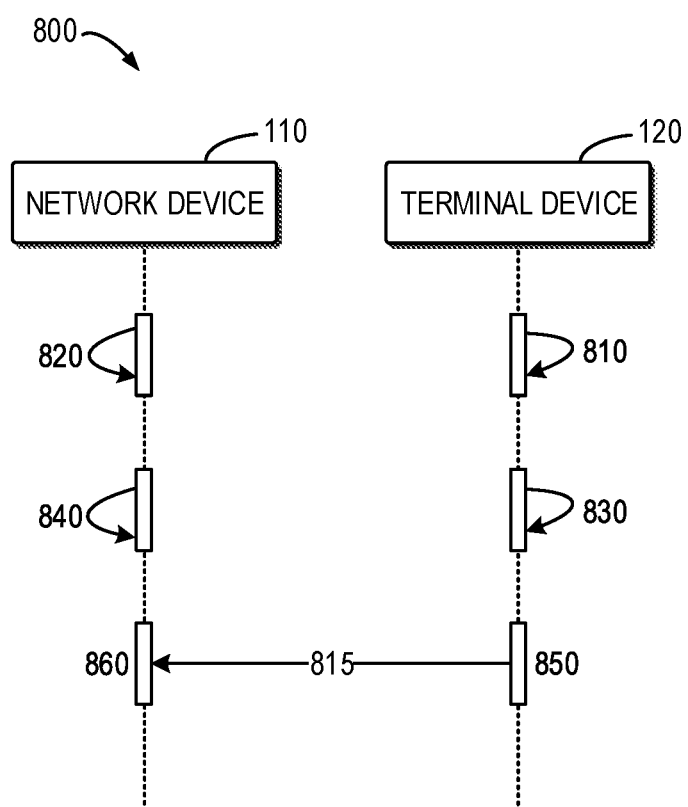
FIG. 8 illustrates an example communication process between a network device and a terminal device in accordance with some embodiments of the present disclosure.

FIG. 8 illustrates an example communication process 800 between the network device 110 and the terminal device 120 in accordance with some embodiments of the present disclosure. For the purpose of discussion, the communication process 800 will be described with reference to FIG. 1. However, it would be appreciated that the communication process 800 may be equally applicable to any other communication scenarios where two communication devices communicate with each other.

As shown in FIG. 8, the terminal device 120 may determine 810 a set of slots for which a set of feedback indications 815 are to be transmitted to the network device 110, based on a feedback slot for transmitting the set of feedback indications 815. For example, if the terminal device 120 is configured or preconfigured to employ a semi-static HARQ-ACK codebook to report HARQ-ACK information in the feedback slot to the network device 110, the terminal device 120 can determine the set of slots based on the feedback slot and a set of candidate offsets (for example, K1 values). In a similar manner, at the other side of the communication process 800, the network device 110 may also determine 820 the set of slots for which the set of feedback indications 815 are to be received from the terminal device 120, based on the feedback slot for receiving the set of feedback indications 815. A specific example will be discussed below with reference to FIG. 9.

Figure 9:
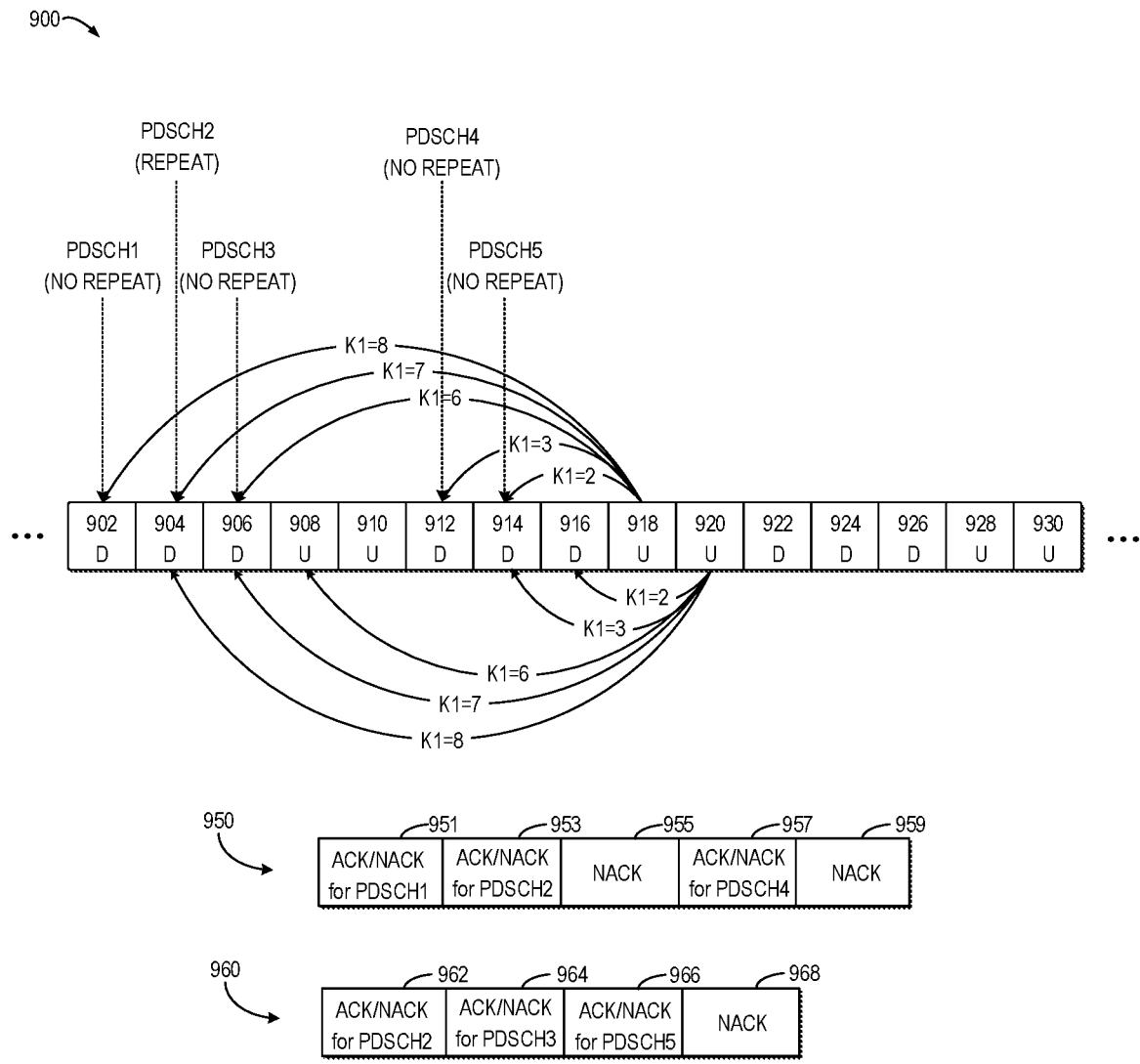
FIG. 9 illustrates an example showing how a terminal device determines a set of feedback indications to be transmitted to a network device in accordance with some embodiments of the present disclosure.

FIG. 9 illustrates an example 900 showing how the terminal device 120 determines the set of feedback indications 815 to be transmitted to the network device 110 in accordance with some embodiments of the present disclosure. In FIG. 9, fifteen (15) slots 902 to 930 are shown, in which slots 902, 904, 906, 912, 914, 916, 922, 924, and 926 (denoted as "D") are slots for downlink transmissions from the network device 110 to the terminal device 120, whereas slots 908, 910, 918, 920, 928, and 930 (denoted as "U") are slots for uplink transmissions from the terminal device 120 to the network device 110. It is to be understood that the number of the slots, the purposes of the slots, and the arrangement of the slots as shown in FIG. 9 are only for example without suggesting any limitations. Embodiments of the present disclosure are equally applicable to any suitable number of the slots, any suitable purposes of the slots, and any suitable arrangement of the slots.

In FIG. 9, it is assumed that the terminal device 120 is configured or preconfigured with a K1 set {2, 3, 6, 7, 8}, and each K1 value may indicate a candidate offset between a slot associated with a downlink transmission and a slot associated with a feedback indication for the downlink transmission. As can be seen from FIG. 9, it is also assumed that the network device 110 transmits a downlink transmission (denoted as PDSCH1) to the terminal device 120 in the slot 902, transmits a downlink transmission (denoted as PDSCH2) to the terminal device 120 in the slot 904, transmits a downlink transmission (denoted as PDSCH3) to the terminal device 120 in the slot 906, transmits a downlink transmission (denoted as PDSCH4) to the terminal device 120 in the slot 912, and transmits a downlink transmission (denoted as PDSCH5) to the terminal device 120 in the slot 914.

Among these downlink transmissions, it is also assumed that the network device 110 instructs the terminal device 120 to report feedback indications for the PDSCH1, the PDSCH2, and the PDSCH4 in the slot 918, and report feedback indications for the PDSCH3 and the PDSCH5 in the slot 920. It is further assumed that the feedback indications for the PDSCH1, the PDSCH3, and the PDSCH4, and PDSCH5 are not configured to be repeatedly transmitted (denoted as no repeat), whereas the feedback indication for the PDSCH2 is configured to be repeatedly transmitted (denoted as repeat).

With reference to both FIGS. 8 and 9, the slots 918 and 920 in FIG. 9 may be two examples of the feedback slot as described associated with FIG. 8 and HARQ-ACK codebooks 950 and 960 in FIG. 9 may be two examples of the set of feedback indications 815 in FIG. 8. In case the slot 918 is the feedback slot and the K1 set is {2, 3, 6, 7, 8}, the terminal device 120 and the network device 110 can determine the set of slots as the slots 902, 904, 906, 912, and 914. In other words, the terminal device 120 may transmit a set of feedback indications 950 for the set of slots 902, 904, 906, 912, and 914 in the feedback slot 918 to the network device 110.

In case the slot 920 is the feedback slot and the K1 set is {2, 3, 6, 7, 8}, the terminal device 120 and the network device 110 can determine the set of slots as the slots 904, 906, 914, and 916. In other words, the terminal device 120 may transmit a set of feedback indications 960 for the set of slots 904, 906, 914, and 916 in the feedback slot 920 to the network device 110. It is noted that in the example of FIG. 9, although the K1 value 6 indicates the slot 908, the slot 908 is used for uplink transmissions rather than downlink transmissions and thus there are no downlink transmissions in the slot 308. Accordingly, the set of feedback indications 960 does not include a feedback indication for the slot 908.

Therefore, as shown in FIG. 9, the set of feedback indications 950 for the feedback slot 918 may include a feedback indication 951 for the slot 902, a feedback indication 953 for the slot 904, a feedback indication 955 for the slot 906, a feedback indication 957 for the slot 912, and a feedback indication 959 for the slot 914. It is noted that since the terminal device 120 is not configured to report feedback indications in the slot 918 for the PDSCH3 in the slot 906 and the PDSCH5 in the slot 914, the terminal device 120 can directly generate NACK values for the feedback indication 955 and the feedback indication 959, respectively.

In addition, as shown in FIG. 9, the set of feedback indications 960 for the feedback slot 920 may include a feedback indication 962 for the slot 904, a feedback indication 964 for the slot 906, a feedback indication 966 for the slot 914, and a feedback indication 968 for the slot 916. It is noted that since the network device 110 does not transmit a downlink transmission to the terminal device 120 in the slot 920, the terminal device 120 can directly generate a NACK value for the feedback indication 968.

In contrast, for the feedback indication 962, the terminal device 120 can determine that the feedback indication for the transmission (for example, the PDSCH2) from the network device 110 to the terminal device 120 in the slot 904 of the set of slots 904, 906, 914, and 916 is not scheduled to be transmitted in the feedback slot 920 (in this example, scheduled to be transmitted in the feedback slot 918) and is configured to be repeatedly transmitted. Therefore, the terminal device 120 may generate 830 the set of feedback indications 960 to include the feedback indication 962 for the transmission (for example, the PDSCH2). In other words, the terminal device 120 may generate a real or actual feedback indication 962 for the transmission in the slot 904 according to whether the transmission is successfully received or not, rather than reporting a NACK value regardless of whether the transmission is successfully received or not.

At the other side of the communication process 800, the network device 110 can determine in a similar manner that the feedback indication for the transmission (for example, the PDSCH2) from the network device 110 to the terminal device 120 in the slot 904 of the set of slots 904, 906, 914, and 916 is not scheduled to be received in the feedback slot 920 (in this example, scheduled to be received in the feedback slot 918) and is configured to be repeatedly received. Therefore, the network device 110 may determine 840 that the set of feedback indications 960 includes the feedback indication 962 for the transmission (for example, the PDSCH2). In other words, the network device 110 can know that a real or actual feedback indication 962 for the transmission in the slot 904 is reported according to whether the transmission is successfully received at the terminal device 120 or not, rather than reporting a NACK value regardless of whether the transmission is successfully received at the terminal device 120 or not.

With reference to FIGS. 8 and 9, after generating 830 the set of feedback indications 815, the terminal device 120 may transmit 850 the set of feedback indications 815 to the network device 110 in the feedback slot. Accordingly, the network device 110 may receive 860 the set of feedback indications 815 from the terminal device 120 in the feedback slot. For example, the terminal device 120 may transmit 850 the set of feedback indications 950 to the network device 110 during the slot 918 in FIG. 9, and transmit 850 the set of feedback indications 960 to the network device 110 during the slot 920 in FIG. 9.

With the communication process 800, a real or actual feedback indication for a downlink transmission can be transmitted from the terminal device 120 to the network device 110 in a feedback slot in case the feedback indication is configured to be repeatedly transmitted, even if the feedback indication is not scheduled to be transmitted in this feedback slot, thereby improving reliability and robustness of the downlink transmission.

Further, it should be noted that with regard to the embodiments of the present disclosure in connection with FIGS. 8 and 9, the section 9.1.2 "Type-1 HARQ-ACK codebook determination" of 3GPP TS 38.213 recites the content as follows. "A UE reports HARQ-ACK information for a corresponding PDSCH reception or SPS PDSCH release only in a HARQ-ACK codebook that the UE transmits in a slot indicated by a value of a PDSCH-to-HARQ_feedback timing indicator field in a corresponding DCI format 1_0 or DCI format 1_1. The UE reports NACK value(s) for HARQ-ACK information bit(s) in a HARQ-ACK codebook that the UE transmits in a slot not indicated by a value of a PDSCH-to-HARQ_feedback timing indicator field in a corresponding DCI format 1_0 or DCI format 1_1."

With the improvement provided by the embodiments of the present disclosure associated with FIGS. 8 and 9, the above conventional content of 3GPP TS 38.213 can be updated as follows. "A UE reports HARQ-ACK information for a corresponding PDSCH reception or SPS PDSCH release only in a HARQ-ACK codebook that the UE transmits in a slot indicated by a value of a PDSCH-to-HARQ_feedback timing indicator field in a corresponding DCI format 1_0 or DCI format 1_1. The UE reports HARQ-ACK information for a corresponding PDSCH reception or SPS PDSCH release in a HARQ-ACK codebook that the UE transmits in a slot not indicated by a value of a PDSCH-to-HARQ_feedback timing indicator field in a corresponding DCI format 1_0 or DCI format 1_1 if the corresponding PDSCH reception or SPS PDSCH release is a repetition of PDSCH or scheduled by a repeated PDCCH, otherwise, the UE reports NACK value(s) for HARQ-ACK information bit(s) in a HARQ-ACK codebook that the UE transmits in a slot not indicated by a value of a PDSCH-to-HARQ_feedback timing indicator field in a corresponding DCI format 1_0 or DCI format 1_1."

Hereinbefore, some embodiments are described in which a real or actual feedback indication for a downlink transmission can be reported by the terminal device 120 to the network device 110 in a feedback slot in case the feedback indication is configured to be repeatedly transmitted, even if the feedback indication is not scheduled to be reported in this feedback slot. Hereinafter, some other embodiments will be described with reference to FIGS. 10 to 13. In these embodiments, one or more parts of feedback information (for example, a HARQ-ACK codebook) to be reported by the terminal device 120 to the network device 110 can be omitted, because these parts are used for repetitive transmissions. Therefore, the overhead of the feedback information (for example, a HARQ-ACK codebook) can be reduced.

Figure 10:
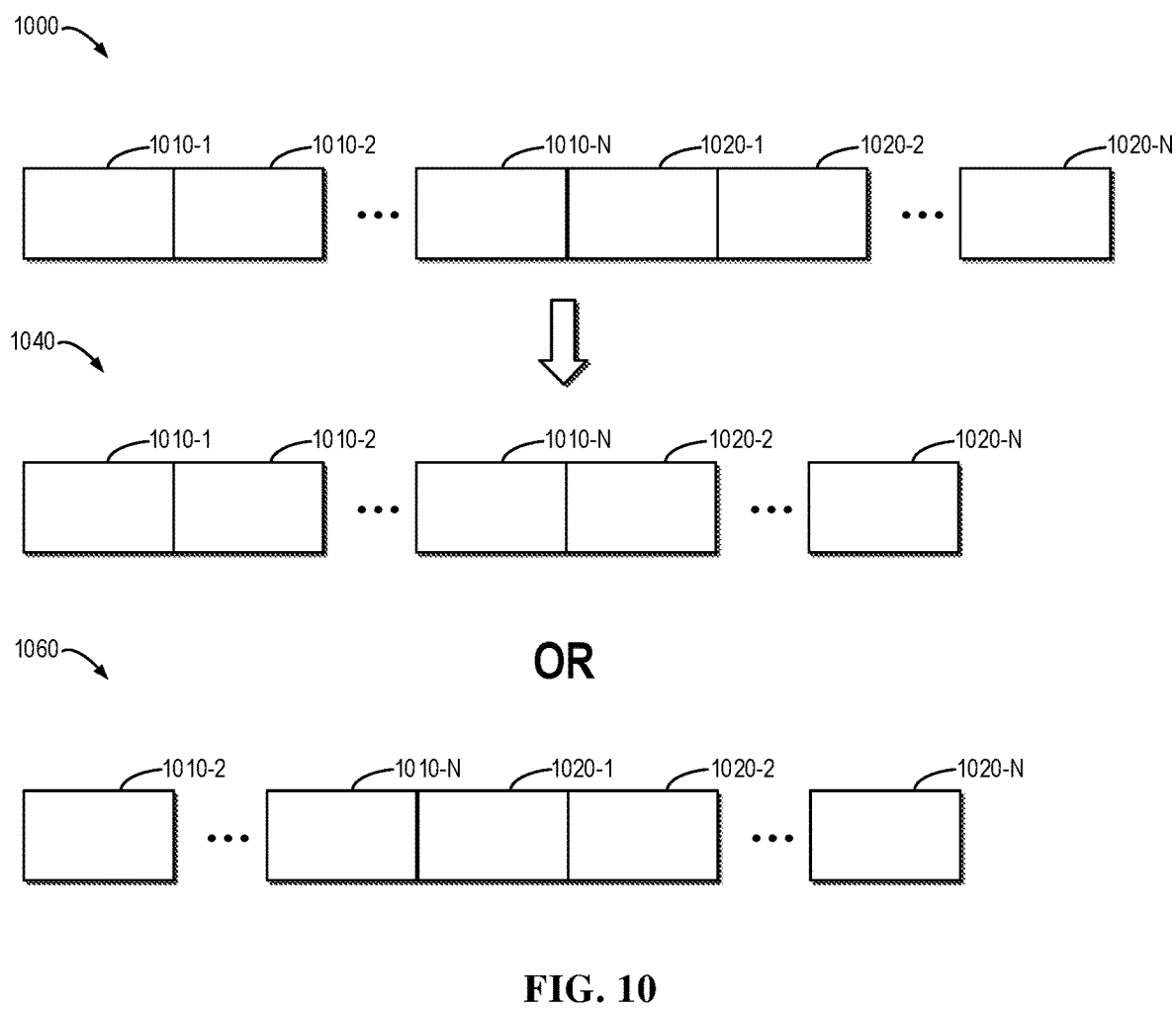
FIG. 10 illustrates an example showing that a repetitive portion of a HARQ-ACK codebook can be removed from the HARQ-ACK codebook in accordance with some embodiments of the present disclosure.

FIG. 10 illustrates an example showing that a repetitive portion of a HARQ-ACK codebook can be removed from the HARQ-ACK codebook in accordance with some embodiments of the present disclosure. In the example of FIG. 10, the terminal device 120 can employ a semi-static HARQ-ACK codebook to generate feedback information for reporting to the network device 110. For example, in case a higher layer index (for example, CORESETPollIndex) per CORESET is configured, for a joint semi-static HARQ-ACK codebook among multiple TRPs, the HARQ-ACK information bits may be concatenated by the increasing order of PDSCH reception occasion index at first, and then serving cell index, and then TRP (namely, a higher layer index configured per CORESET). In some embodiments, CORESETs configured with a CORESETPollIndex of value 0 may be related to a first TRP associated with the network device 110, CORESETs configured with a CORESETPollIndex of value 1 may be related to a second TRP associated with the network device 110, and vice versa.

In the example of FIG. 10, it is assumed that two CORESETs (for example CORESET A and CORESET B in a same serving cell S1) are configured for PDCCH repetitions, and the CORESET A is configured with a value 0 for CORESETPoolIndex, and the CORESET B is configured with a value 1 for CORESETPoolIndex. For example, a PDCCH associated with the CORESET B is configured for a repetition of a PDCCH associated with the CORESET A. In this event, there may be only a single HARQ-ACK feedback field (for example, 1 or 2 bits) for a PDSCH scheduled by the repeated PDCCHs associated with the CORESET A and the CORESET B. Therefore, for a semi-static HARQ-ACK codebook reported by the terminal device 120 to the network device 110, there is no need to include HARQ-ACK fields for one of the CORESET A and the CORESET B.

As shown in FIG. 10 in which a joint HARQ feedback codebook is configured, a conventional HARQ-ACK codebook 1000 may include a HAQR-ACK portion 1010-1 for HAQR-ACK fields based on a K1 set $K1_{S1}$ for a serving cell S1, a HAQR-ACK portion 1010-2 for HAQR-ACK fields based on a K1 set $K1_{S2}$ for a serving cell S2, . . . , a HAQR-ACK portion 1010-N for HAQR-ACK fields based on a K1 set $K1_{Sc}$ for a serving cell Sc, a HAQR-ACK portion 1020-1 for HAQR-ACK fields based on the K1 set $K1_{S1}$ for the CORESET configured with a CORESETPollIndex of value 1 for the serving cell S1, a HAQR-ACK portion 1020-2 for HAQR-ACK fields based on the K1 set $K1_{S2}$ for the CORESET configured with a CORESETPollIndex of value 1 for the serving cell S2, . . . , and a HAQR-ACK portion 1020-N for HAQR-ACK fields based on the K1 set $K1_{Sc}$ for the CORESET configured with a CORESETPollIndex of value 1 for serving cell Sc.

In the example of FIG. 10, since the PDCCH associated with the CORESET B (with a CORESETPoolIndex of value 1) is configured for a repetition of the PDCCH associated with the CORESET A (with a CORESETPoolIndex of value 0) in the same serving cell S1, the HARQ-ACK portion 1020-1 for the CORESET B for the serving cell S1 may not need to be reported from the terminal device 120 to the network device 110. In other word, the HARQ-ACK field for the PDSCH associated with the CORESET A and the CORESET B may be determined by the PDSCH occasion and the serving cell index for the CORESET A.

Accordingly, in the example of FIG. 10, the conventional HARQ-ACK codebook 1000 can be reduced to a HARQ-ACK codebook 1040 which may include the HAQR-ACK portion 1010-1 for the HAQR-ACK fields based on the K1 set $K1_{S1}$ for the serving cell S1, the HAQR-ACK portion 1010-2 for the HAQR-ACK fields based on the K1 set $K1_{S2}$ for the serving cell S2, . . . , the HAQR-ACK portion 1010-N for the HAQR-ACK fields based on the K1 set $K1_{Sc}$ for the serving cell Sc, the HAQR-ACK portion 1020-2 for the HAQR-ACK fields based on the K1 set $K1_{S2}$ for the CORESET configured with a CORESETPollIndex of value 1 for the serving cell S2, . . . , and the HAQR-ACK portion 1020-N for the HAQR-ACK fields based on the K1 set $K1_{Sc}$ for the CORESET configured with a CORESETPollIndex of value 1 for the serving cell Sc, but excludes the HAQR-ACK portion 1020-1 for the HAQR-ACK fields based on the K1 set $K1_{S1}$ for the CORESET configured with a CORESETPollIndex of value 1 for the serving cell S1.

Alternatively, since the PDCCH associated with the CORESET B (with a CORESETPoolIndex of value 1) is configured for a repetition of the PDCCH associated with the CORESET A (with a CORESETPoolIndex of value 0) in the same serving cell S1, the HARQ-ACK portion 1010-1 for the CORESET A for the serving cell S1 may not need to be reported from the terminal device 120 to the network device 110. In other word, the HARQ-ACK field for the PDSCH associated with the CORESET A and the CORESET B may be determined by the PDSCH occasion and the serving cell index for the CORESET B.

Accordingly, in the example of FIG. 10, the conventional HARQ-ACK codebook 1000 can be reduced to a HARQ-ACK codebook 1060 which may include the HAQR-ACK portion 1010-2 for the HAQR-ACK fields based on the K1 set $K1_{S2}$ for the serving cell S2, . . . , the HAQR-ACK portion 1010-N for the HAQR-ACK fields based on the K1 set $K1_{Sc}$ for the serving cell Sc, the HAQR-ACK portion 1020-1 for the HAQR-ACK fields based on the K1 set $K1_{S1}$ for the CORESET configured with a CORESETPollIndex of value 1 for the serving cell S1, the HAQR-ACK portion 1020-2 for the HAQR-ACK fields based on the K1 set $K1_{S2}$ for the CORESET configured with a CORESETPollIndex of value 1 for the serving cell S2, . . . , and the HAQR-ACK portion 1020-N for the HAQR-ACK fields based on the K1 set $K1_{Sc}$ for the CORESET configured with a CORESETPollIndex of value 1 for the serving cell Sc, but excludes the HAQR-ACK portion 1010-1 for the HAQR-ACK fields based on the K1 set $K1_{S1}$ for the serving cell S1.

Figure 11:
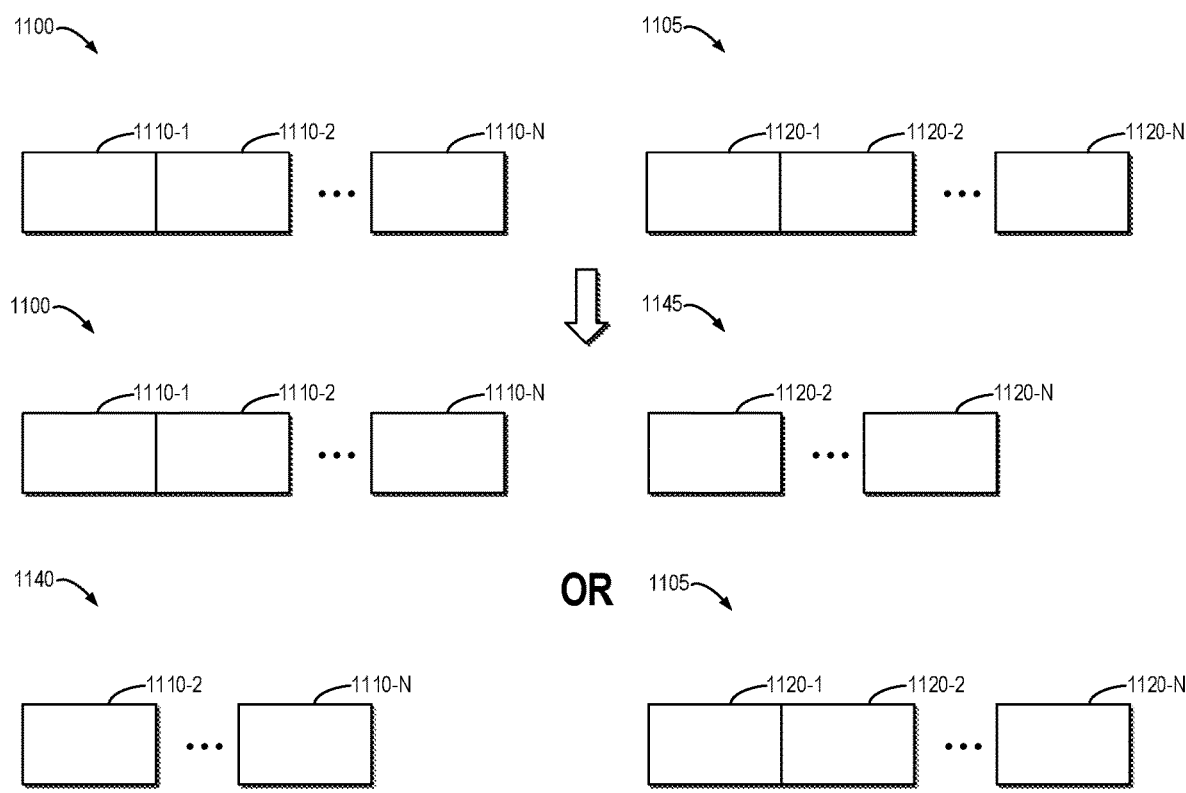
FIG. 11 illustrates an example showing that a repetitive portion of a HARQ-ACK codebook can be removed from the HARQ-ACK codebook in accordance with some embodiments of the present disclosure.

FIG. 11 illustrates an example showing that a repetitive portion of a HARQ-ACK codebook can be removed from the HARQ-ACK codebook in accordance with some embodiments of the present disclosure. Different from the joint HARQ feedback codebook for the CORESETs with different CORESET pool indexes as shown in FIG. 10, the example of FIG. 11 shows separate HARQ feedback codebooks for the CORESETs with different CORESET pool indexes.

For example, a conventional HARQ-ACK codebook 1100 for the CORESET configured with a CORESETPollIndex of value 0 may include a HAQR-ACK portion 1110-1 for HAQR-ACK fields based on the K1 set $K1_{S1}$ for the serving cell S1, a HAQR-ACK portion 1110-2 for HAQR-ACK fields based on the K1 set $K1_{S2}$ for the serving cell S2, . . . , and a HAQR-ACK portion 1110-N for HAQR-ACK fields based on the K1 set $K1_{Sc}$ for the serving cell Sc. A conventional HARQ-ACK codebook 1105 for the CORESET configured with a CORESETPollIndex of value 1 may include a HAQR-ACK portion 1120-1 for HAQR-ACK fields based on the K1 set $K1_{S1}$ for the CORESET configured with a CORESETPollIndex of value 1 for the serving cell S1, a HAQR-ACK portion 1120-2 for HAQR-ACK fields based on the K1 set $K1_{S2}$ for the CORESET configured with a CORESETPollIndex of value 1 for the serving cell S2, . . . , and a HAQR-ACK portion 1120-N for HAQR-ACK fields based on the K1 set $K1_{Sc}$ for the CORESET configured with a CORESETPollIndex of value 1 for the serving cell Sc.

In the example of FIG. 11, since the PDCCH associated with the CORESET B (with a CORESETPoolIndex of value 1) is configured for a repetition of the PDCCH associated with the CORESET A (with a CORESETPoolIndex of value 0) in the same serving cell S1, the HARQ-ACK portion 1120-1 for the CORESET B for the serving cell S1 may not need to be reported from the terminal device 120 to the network device 110. In other word, the HARQ-ACK field for the PDSCH associated with the CORESET A and the CORESET B may be determined by the PDSCH occasion and the serving cell index for the CORESET A.

Accordingly, the HARQ-ACK codebook 1100 for the CORESET configured with a CORESETPollIndex of value 0 can be unchanged. The HARQ-ACK codebook 1105 for the CORESET configured with a CORESETPollIndex of value 1 can be reduced to a HARQ-ACK codebook 1145 which can include the HAQR-ACK portion 1120-2 for the HAQR-ACK fields based on the K1 set $K1_{S2}$ for the CORESET configured with a CORESETPollIndex of value 1 for the serving cell S2, . . . , and the HAQR-ACK portion 1120-N for the HAQR-ACK fields based on the K1 set $K1_{Sc}$ for the CORESET configured with a CORESETPollIndex of value 1 for the serving cell Sc, but excludes the HAQR-ACK portion 1120-1 for the HAQR-ACK fields based on the K1 set $K1_{S1}$ for the CORESET configured with a CORESETPollIndex of value 1 for the serving cell S1.

Alternatively, since the PDCCH associated with the CORESET B (with a CORESETPoolIndex of value 1) is configured for a repetition of the PDCCH associated with the CORESET A (with a CORESETPoolIndex of value 0) in the same serving cell S1, the HARQ-ACK portion 1110-1 for the CORESET A for the serving cell S1 may not need to be reported from the terminal device 120 to the network device 110. In other word, the HARQ-ACK field for the PDSCH associated with the CORESET A and the CORESET B may be determined by the PDSCH occasion and the serving cell index for the CORESET B.

Accordingly, the HARQ-ACK codebook 1100 for the CORESET configured with a CORESETPollIndex of value 0 can be reduced to a HARQ-ACK codebook 1140 which may include the HAQR-ACK portion 1110-2 for the HAQR-ACK fields based on the K1 set $K1_{S2}$ for the serving cell S2, . . . , and the HARQ-ACK portion 1110-N for the HAQR-ACK fields based on K1 set $K1_{Sc}$ for the serving cell Sc, but excludes the HAQR-ACK portion 1010-1 for the HAQR-ACK fields based on K1 set $K1_{S1}$ for serving cell S1. The HARQ-ACK codebook 1105 for the CORESET configured with a CORESETPollIndex of value 1 can be unchanged.

FIGS. 10 and 11 depict some embodiments in which the CORESET A and the CORESET B are in the same serving cell S1. In some other embodiments, the CORESET A and CORESET B may be configured in different serving cells and configured for PDCCH repetitions. In such embodiments, the joint HARQ-ACK codebook 1000 in FIG. 10 and the separate HARQ-ACK codebooks 1100 and 1105 in FIG. 11 can be simplified in a similar way. In some further embodiments, one or more new values in addition to value 0 and value 1 for CORESETPoolIndex may be defined for CORESETs associated with repeated PDCCHs.

For example, the value 2 or 3 may be defined for the CORESETPoolIndex. In this event, a PDCCH associated with a CORESET with the CORESETPoolIndex of value 2 can be a repetition of a PDCCH associated with a CORESET with a CORESETPoolIndex of value 0, a PDCCH associated with a CORESET with the CORESETPoolIndex of value 3 can be a repetition of a PDCCH associated with a CORESET with a CORESETPoolIndex of value 1, and vice versa. As another example, the new values of the CORESETPoolIndex can be any other possible values. In some embodiments, a value of the CORESETPoolIndex for a particular CORESET can be informed by the network device 110 to the terminal device 120 via a RRC message, a MAC CE, or a DCI. Since the CORESETs with CORESETPoolIndex of the new values are used for PDCCH repetitions, there may be no HARQ-ACK fields in a HARQ-ACK codebook for the CORESETs configured with the CORESETPoolIndex of the new value, such as, 2 or 3.

Figure 12:
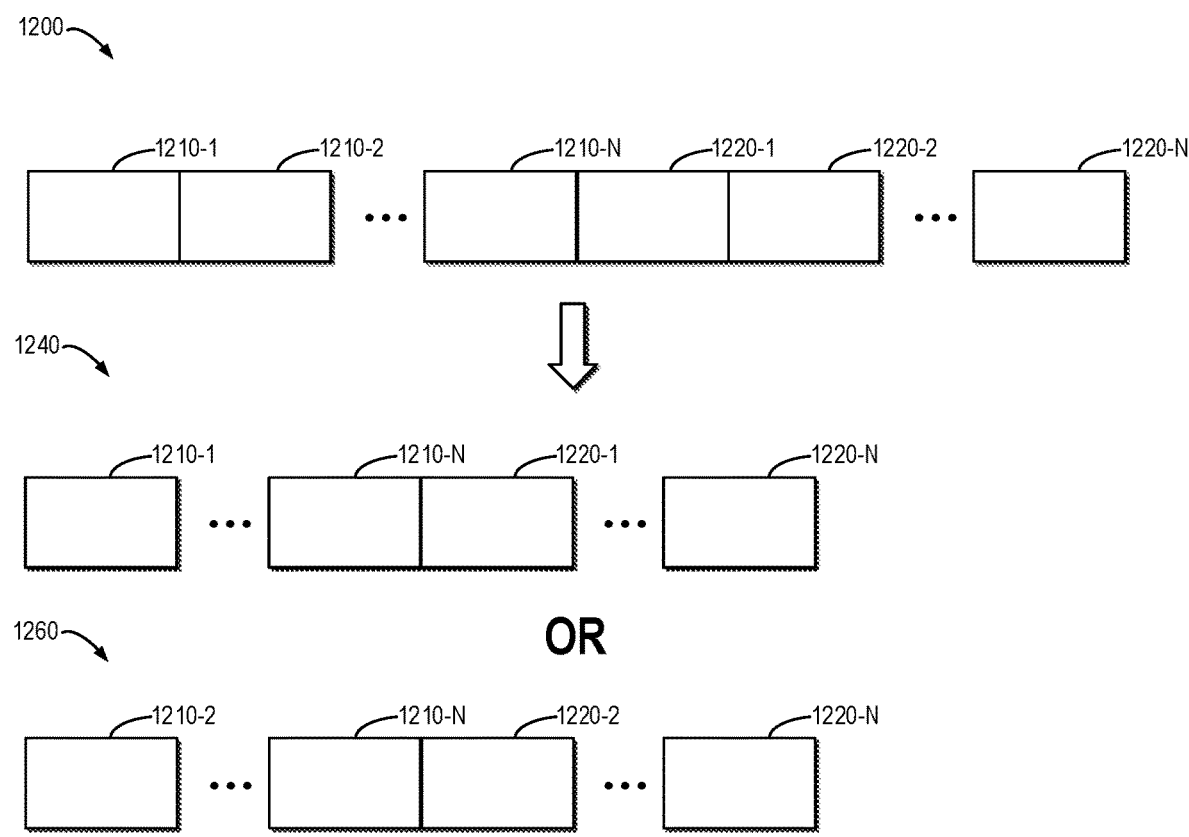
FIG. 12 illustrates an example showing that a repetitive portion of a HARQ-ACK codebook can be removed from the HARQ-ACK codebook in accordance with some embodiments of the present disclosure.

FIG. 12 illustrates an example showing that a repetitive portion of a HARQ-ACK codebook can be removed from the HARQ-ACK codebook in accordance with some embodiments of the present disclosure. Different from the example of FIG. 10, it is assumed that two serving cells (for example, the serving cell S1 and the serving cell S2) are configured for PDCCH repetitions. For example, a PDCCH associated with the serving cell S2 is configured for a repetition of a PDCCH associated with the serving cell S1. In this event, there may be only a single HARQ-ACK feedback (1 or 2 bits) for a PDSCH scheduled by the repeated PDCCHs associated with the serving cell S1 and the serving cell S2. Therefore, for a semi-static HARQ-ACK codebook reported by the terminal device 120 to the network device 110, there is no need to include HARQ-ACK fields for one of the serving cell S1 and the serving cell S2.

As shown in FIG. 12 in which a joint HARQ feedback codebook is configured, a conventional HARQ-ACK codebook 1200 may include a HAQR-ACK portion 1210-1 for HAQR-ACK fields based on the K1 set $K1_{S1}$ for the serving cell S1, a HAQR-ACK portion 1210-2 for HAQR-ACK fields based on the K1 set $K1_{S2}$ for the serving cell S2, . . . , a HAQR-ACK portion 1210-N for HAQR-ACK fields based on the K1 set $K1_{Sc}$ for the serving cell Sc, a HAQR-ACK portion 1220-1 for HAQR-ACK fields based on the K1 set $K1_{S1}$ for the CORESET configured with a CORESETPollIndex of value 1 for the serving cell S1, a HAQR-ACK portion 1220-2 for HAQR-ACK fields based on the K1 set $K1_{S2}$ for the CORESET configured with a CORESETPollIndex of value 1 for the serving cell S2, . . . , and a HAQR-ACK portion 1220-N for HAQR-ACK fields based on the K1 set $K1_{Sc}$ for the CORESET configured with a CORESETPollIndex of value 1 for the serving cell Sc.

In the example of FIG. 12, since the PDCCH associated with the serving cell S2 is configured for a repetition of the PDCCH associated with the serving cell S1, the HARQ-ACK portion 1210-2 and the HARQ-ACK portion 1220-2 for the serving cell S2 may not need to be reported to the terminal device 120 to the network device 110. In other word, the HARQ-ACK field for the PDSCH associated with the serving cell S1 and the serving cell S2 may be determined by the PDSCH occasion and the serving cell index for the serving cell S1.

Accordingly, the conventional HARQ-ACK codebook 1200 can be reduced to a HARQ-ACK codebook 1240 which may include the HAQR-ACK portion 1210-1 for the HAQR-ACK fields based on the K1 set $K1_{S1}$ for the serving cell S1, . . . , and the HAQR-ACK portion 1210-N for the HAQR-ACK fields based on the K1 set $K1_{Sc}$ for the serving cell Sc, the HAQR-ACK portion 1220-1 for the HAQR-ACK fields based on the K1 set $K1_{S1}$ for the CORESET configured with a CORESETPollIndex of value 1 for the serving cell S1, . . . , and the HAQR-ACK portion 1220-N for the HAQR-ACK fields based on the K1 set $K1_{Sc}$ for the CORESET configured with a CORESETPollIndex of value 1 for the serving cell Sc, but excludes the HAQR-ACK portion 1210-2 for the HAQR-ACK fields based on the K1 set $K1_{S2}$ for the serving cell S2 and the HAQR-ACK portion 1220-2 for the HAQR-ACK fields based on the K1 set $K1_{S2}$ for the CORESET configured with a CORESETPollIndex of value 1 for the serving cell S2.

Alternatively, since the PDCCH associated with the serving cell S2 is configured for a repetition of the PDCCH associated with the serving cell S1, the HARQ-ACK portion 1210-1 and the HARQ-ACK portion 1220-1 for the serving cell S1 may not need to be reported from the terminal device 120 to the network device 110. In other word, the HARQ-ACK field for the PDSCH associated with the serving cell S1 and the serving cell S2 may be determined by the PDSCH occasion and the serving cell index for the serving cell S2.

Accordingly, the conventional HARQ-ACK codebook 1200 can be reduced to a HARQ-ACK codebook 1260 which may include the HAQR-ACK portion 1210-2 for the HAQR-ACK fields based on K1 set $K1_{S2}$ for serving cell S2, . . . , the HAQR-ACK portion 1210-N for the HAQR-ACK fields based on K1 set $K1_{Sc}$ for serving cell Sc, the HAQR-ACK portion 1220-2 for the HAQR-ACK fields based on K1 set $K1_{S2}$ for the CORESET configured with a CORESETPollIndex of value 1 for serving cell S2, . . . , and the HAQR-ACK portion 1220-N for the HAQR-ACK fields based on K1 set $K1_{Sc}$ for the CORESET configured with a CORESETPollIndex of value 1 for serving cell Sc, but excludes the HAQR-ACK portion 1210-1 for the HAQR-ACK fields based on the K1 set $K1_{S1}$ for the serving cell S1 and the HAQR-ACK portion 1220-1 for the HAQR-ACK fields based on the K1 set $K1_{S1}$ for the CORESET configured with a CORESETPollIndex of value 1 for the serving cell S1.

Figure 13:
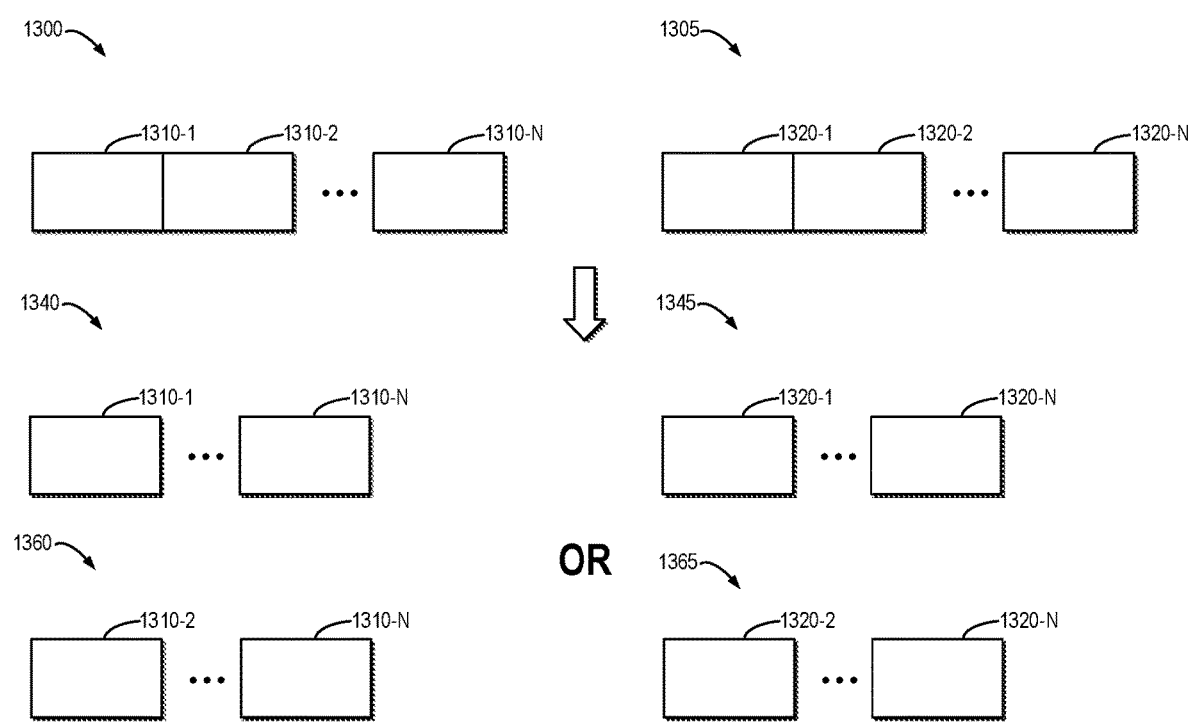
FIG. 13 illustrates an example showing that a repetitive portion of a HARQ-ACK codebook can be removed from the HARQ-ACK codebook in accordance with some embodiments of the present disclosure.

FIG. 13 illustrates an example showing that a repetitive portion of a HARQ-ACK codebook can be removed from the HARQ-ACK codebook in accordance with some embodiments of the present disclosure. Different from the joint HARQ feedback codebook for the CORESETs with different CORESET pool indexes as shown in FIG. 12, the example of FIG. 13 shows separate HARQ feedback codebooks for the CORESETs with different CORESET pool indexes.

For example, a conventional HARQ-ACK codebook 1300 for the CORESET configured with a CORESETPollIndex of value 0 may include a HAQR-ACK portion 1310-1 for HAQR-ACK fields based on K1 set $K1_{S1}$ for a serving cell S1, a HAQR-ACK portion 1310-2 for HAQR-ACK fields based on K1 set $K1_{S2}$ for a serving cell S2, . . . , and a HAQR-ACK portion 1310-N for HAQR-ACK fields based on a K1 set $K1_{Sc}$ for a serving cell Sc. A HARQ-ACK codebook 1305 for the CORESET configured with a CORESETPollIndex of value 1 may include a HAQR-ACK portion 1320-1 for HAQR-ACK fields based on the K1 set $K1_{S1}$ for the CORESET configured with a CORESETPollIndex of value 1 for the serving cell S1, a HAQR-ACK portion 1320-2 for HAQR-ACK fields based on the K1 set $K1_{S2}$ for the CORESET configured with a CORESETPollIndex of value 1 for the serving cell S2, . . . , and a HAQR-ACK portion 1320-N for HAQR-ACK fields based on the K1 set $K1_{Sc}$ for the CORESET configured with a CORESETPollIndex of value 1 for the serving cell Sc.

In the example of FIG. 13, since the PDCCH associated with the serving cell S2 is configured for a repetition of the PDCCH associated with the serving cell S1, the HARQ-ACK portion 1310-2 and the HARQ-ACK portion 1320-2 for the serving cell S2 may not need to be reported from the terminal device 120 to the network device 110. In other word, the HARQ-ACK field for the PDSCH associated with the serving cell S1 and the serving cell S2 may be determined by the PDSCH occasion and the serving cell index for the serving cell S1.

Accordingly, the HARQ-ACK codebook 1300 for the CORESET configured with a CORESETPollIndex of value 0 can be reduced to a HARQ-ACK codebook 1340 which can include the HAQR-ACK portion 1310-1 for the HAQR-ACK fields based on the K1 set $K1_{S1}$ for the serving cell S1, . . . , and the HAQR-ACK portion 1310-N for the HAQR-ACK fields based on the K1 set $K1_{Sc}$ for the serving cell Sc, but excludes the HAQR-ACK portion 1310-2 for the HAQR-ACK fields based on the K1 set $K1_{S2}$ for the serving cell S2. The HARQ-ACK codebook 1305 for the CORESET configured with a CORESETPollIndex of value 1 can be reduced to a HARQ-ACK codebook 1345 which can include the HAQR-ACK portion 1320-1 for the HAQR-ACK fields based on the K1 set $K1_{S1}$ for the CORESET configured with a CORESETPollIndex of value 1 for the serving cell S1, . . . , and the HAQR-ACK portion 1320-N for the HAQR-ACK fields based on the K1 set $K1_{Sc}$ for the CORESET configured with a CORESETPollIndex of value 1 for the serving cell Sc, but excludes the HAQR-ACK portion 1320-2 for the HAQR-ACK fields based on the K1 set $K1_{S2}$ for the CORESET configured with a CORESETPollIndex of value 1 for the serving cell S2.

Alternatively, since the PDCCH associated with the serving cell S2 is configured for a repetition of the PDCCH associated with the serving cell S1, the HARQ-ACK portion 1310-1 and the HARQ-ACK portion 1320-1 for the serving cell S1 may not need to be reported from the terminal device 120 to the network device 110. In other word, the HARQ-ACK field for the PDSCH associated with the serving cell S1 and the serving cell S2 may be determined by the PDSCH occasion and the serving cell index for the serving cell S2.

Accordingly, the HARQ-ACK codebook 1300 for the CORESET configured with a CORESETPollIndex of value 0 can be reduced to a HARQ-ACK codebook 1360 which can include the HAQR-ACK portion 1310-2 for the HAQR-ACK fields based on the K1 set $K1_{S2}$ for the serving cell S2, . . . , and the HAQR-ACK portion 1310-N for the HAQR-ACK fields based on the K1 set $K1_{Sc}$ for the serving cell Sc, but excludes the HAQR-ACK portion 1310-1 for the HAQR-ACK fields based on the K1 set $K1_{S1}$ for the serving cell S1. The HARQ-ACK codebook 1305 for the CORESET configured with a CORESETPollIndex of value 1 can be reduced to a HARQ-ACK codebook 1365 which can include the HAQR-ACK portion 1320-2 for the HAQR-ACK fields based on the K1 set $K1_{S2}$ for the CORESET configured with a CORESETPollIndex of value 1 for the serving cell S2, . . . , and the HAQR-ACK portion 1320-N for the HAQR-ACK fields based on the K1 set $K1_{Sc}$ for the CORE- SET configured with a CORESETPollIndex of value 1 for the serving cell Sc, but excludes the HAQR-ACK portion 1320-1 for the HAQR-ACK fields based on the K1 set $K1_{S1}$ for the CORESET configured with a CORESETPollIndex of value 1 for the serving cell S1.

In some embodiments, a plurality of PDCCHs and/or PDSCHs may be configured to the terminal device 120. For example, the plurality of PDCCHs may be used to schedule a same transmission of transport block or PDSCH or data. For another example, the plurality of PDSCHs may be used to transmit a same transmission of transport block or data. And the number of the plurality of PDCCHs and/or PDSCHs may be X, and X is a positive integer. For example, $1 \leq X \leq 16$. In some embodiments, a plurality of PUCCHs and/or PUSCHs and/or HARQ-ACK feedbacks of the scheduling of X PDCCHs or the X PDSCHs may be configured to the terminal device 120. For example, the plurality of PUCCHs and/or PUSCHs may be used to transmit the HARQ-ACK feedbacks of the scheduling of X PDCCHs or the X PDSCHs. And the number of the plurality of PUCCHs and/or PUSCHs and/or HARQ-ACK feedbacks of the scheduling of X PDCCHs or the X PDSCHs may be Y, and Y is a positive integer. For example, $1 \leq Y \leq 16$.

In some embodiments, if at least one of the scheduling of the X PDCCHs or at least one of the X PDSCHs is decoded successfully or the HARQ-ACK of at least one of the scheduling of the X PDCCHs or at least one of the X PDSCHs is ACK, ACK will be transmitted in each of the Y PUCCHs and/or the Y PUSCHs and/or the Y HARQ-ACK feedbacks of the scheduling of X PDCCHs or the X PDSCHs. In some embodiments, if none of the scheduling of the X PDCCHs or none of the X PDSCHs is decoded successfully or the HARQ-ACK of none of the scheduling of the X PDCCHs or none of the X PDSCHs is ACK, NACK will be transmitted in each of the Y PUCCHs and/or the Y PUSCHs and/or the Y HARQ-ACK feedbacks of the scheduling of X PDCCHs or the X PDSCHs. In some embodiments, if all of the scheduling of the X PDCCHs or all of the X PDSCHs are decoded unsuccessfully or the HARQ-ACKs of all of the scheduling of the X PDCCHs or all of the X PDSCHs are NACK, NACK will be transmitted in each of the Y PUCCHs and/or the Y PUSCHs and/or the Y HARQ-ACK feedbacks of the scheduling of X PDCCHs or the X PDSCHs.

Figure 14:
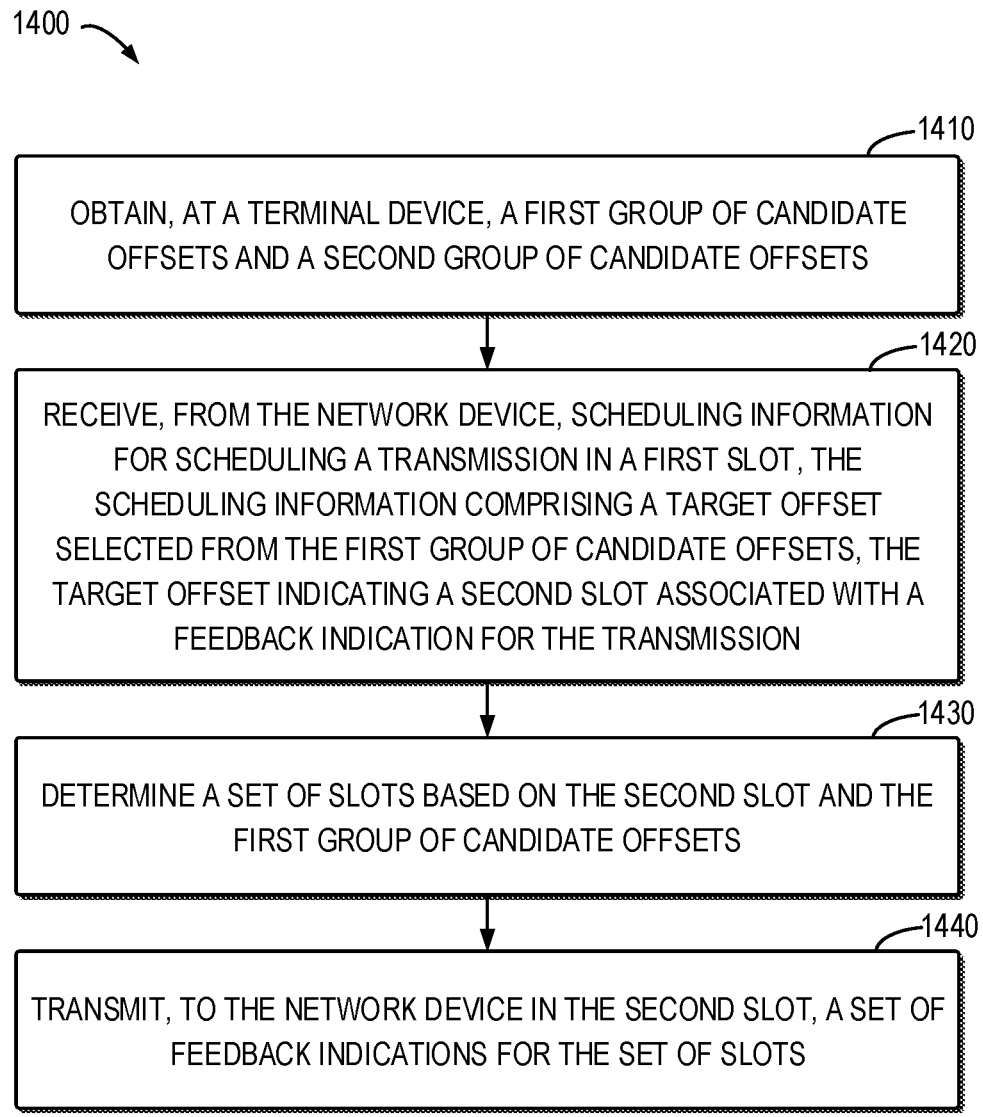
FIG. 14 illustrates a flowchart of an example method in accordance with some embodiments of the present disclosure.

FIG. 14 illustrates a flowchart of an example method 1400 in accordance with some embodiments of the present disclosure. In some embodiments, the method 1400 can be implemented at a terminal device, such as the terminal device 120 as shown in FIG. 1, for performing the communication process 300 as shown in FIG. 3 with a network device. Additionally or alternatively, the method 1400 can also be implemented at other terminal devices not shown in FIG. 1. For the purpose of discussion, the method 1400 will be described with reference to FIG. 1 as performed by the terminal device 120 without loss of generality.

At block 1410, the terminal device 120 may obtain a first group of candidate offsets and a second group of candidate offsets, the first group of candidate offsets being between a slot associated with a transmission of a first type from the network device 110 to the terminal device 120 and a slot associated with a feedback indication for the transmission of the first type, the second group of candidate offsets being between a slot associated with a transmission of a second type from the network device to the terminal device and a slot associated with a feedback indication for the transmission of the second type. At block 1420, the terminal device 120 may receive, from the network device 110, scheduling information for scheduling a transmission in a first slot, the scheduling information comprising a target offset selected from the first group of candidate offsets, the target offset indicating a second slot associated with a feedback indication for the transmission. At block 1430, the terminal device 120 may determine a set of slots based on the second slot and the first group of candidate offsets. At block 1430, the terminal device 120 may transmit, to the network device 110 in the second slot, a set of feedback indications for the set of slots.

In some embodiments, the transmission of the first type may include a transmission without repetition or a first-time transmission followed by at least one repetitive transmission; and the transmission of the second type may include a repetitive transmission.

In some embodiments, the method 1400 may further comprise: receiving, from the network device 110, further scheduling information for scheduling a repetitive transmission of the transmission in a third slot between the first slot and the second slot, the further scheduling information comprising a further target offset selected from the second group of candidate offsets to indicate the second slot.

In some embodiments, obtaining the first group of candidate offsets and the second group of candidate offsets may comprise: receiving, from the network device 110, a first set of candidate offsets for transmissions of the first type and a second set of candidate offsets for transmissions of the second type; determining the first set of candidate offsets as the first group of candidate offsets; and determining the second set of candidate offsets as the second group of candidate offsets.

In some embodiments, obtaining the first group of candidate offsets and the second group of candidate offsets may comprise: receiving, from the network device 110, a first set of candidate offsets for transmissions without repetition and a second set of candidate offsets for transmissions with repetition; determining a combination of the first set of candidate offsets and a part of the second set of candidate offsets for first-time transmissions as the first group of candidate offsets; and determining a further part of the second set of candidate offsets as the second group of candidate offsets.

In some embodiments, the method 1400 may further comprise: arranging the set of feedback indications based on magnitudes of candidate offsets in the first set of candidate offsets and the part of the second set of candidate offsets; or arranging the set of feedback indications by concatenating feedback indications associated with the first set of candidate offsets and feedback indications associated with the part of the second set of candidate offsets.

In some embodiments, obtaining the first group of candidate offsets and the second group of candidate offsets may comprise: receiving, from the network device 110, a set of candidate offsets for transmissions of the first type and transmissions of the second type; determining a part of the set of candidate offsets for transmissions of the first type as the first group of candidate offsets; and determining a further part of the set of candidate offsets as the second group of candidate offsets.

In some embodiments, determining the set of slots may comprise: in accordance with a determination that there is a common candidate offset between the first group of candidate offsets and the second group of candidate offsets, determining a slot based on the second slot and the common candidate offset.

Figure 15:
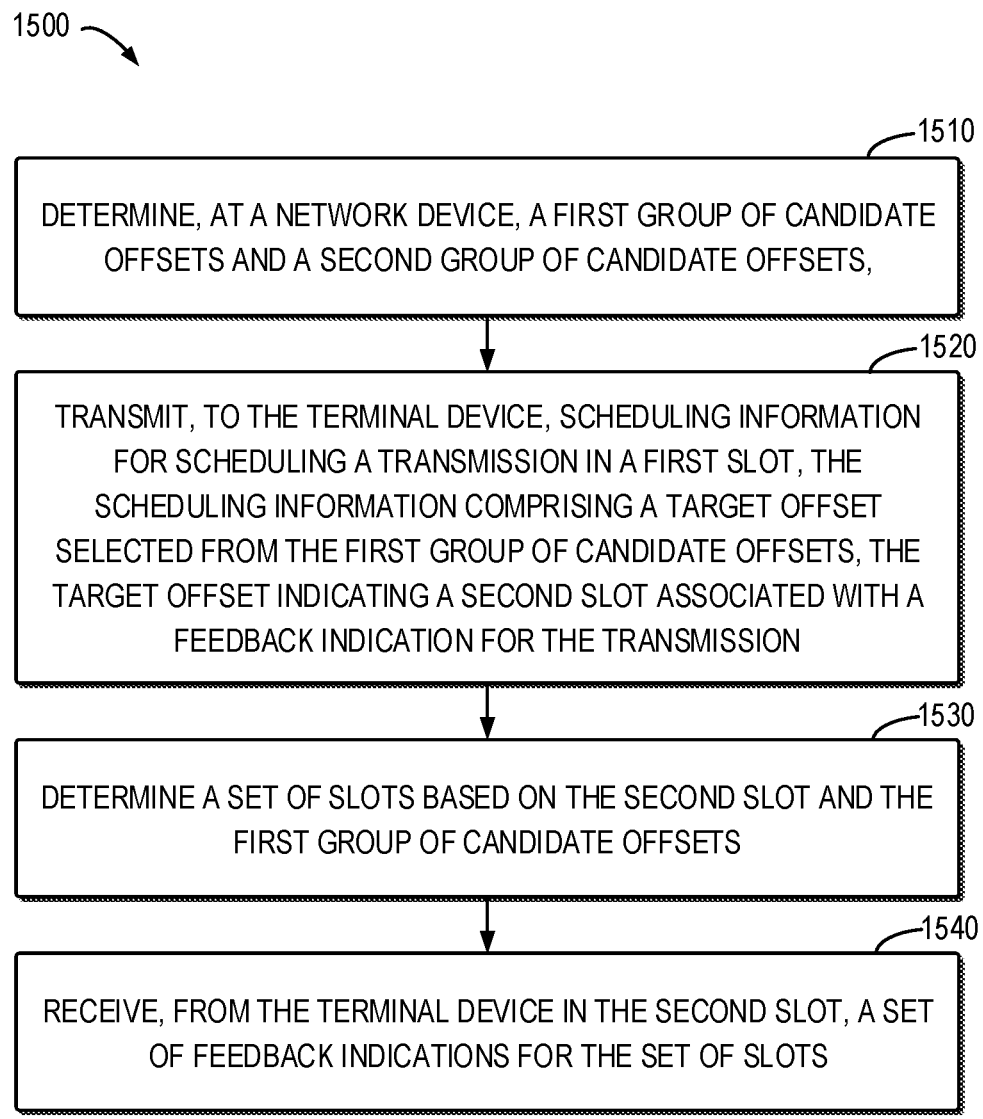
FIG. 15 illustrates a flowchart of an example method in accordance with some embodiments of the present disclosure.

FIG. 15 illustrates a flowchart of another example method 1500 in accordance with some embodiments of the present disclosure. In some embodiments, the method 1500 can be implemented at a network device, such as the network device 110 as shown in FIG. 1, for performing the communication process 300 as shown in FIG. 3 with a terminal device. Additionally or alternatively, the method 1500 can also be implemented at other network devices not shown in FIG. 1. For the purpose of discussion, the method 1500 will be described with reference to FIG. 1 as performed by the network device 110 without loss of generality.

At block 1510, the network device 110 may determine a first group of candidate offsets and a second group of candidate offsets, the first group of candidate offsets being between a slot associated with a transmission of a first type from the network device 110 to the terminal device 120 and a slot associated with a feedback indication for the transmission of the first type, the second group of candidate offsets being between a slot associated with a transmission of a second type from the network device to the terminal device and a slot associated with a feedback indication for the transmission of the second type. At block 1520, the network device 110 may transmit, to the terminal device 120, scheduling information for scheduling a transmission in a first slot, the scheduling information comprising a target offset selected from the first group of candidate offsets, the target offset indicating a second slot associated with a feedback indication for the transmission. At block 1530, the network device 110 may determine a set of slots based on the second slot and the first group of candidate offsets. At block 1540, the network device 110 may receive, from the terminal device 120 in the second slot, a set of feedback indications for the set of slots.

In some embodiments, the transmission of the first type may include a transmission without repetition or a first-time transmission followed by at least one repetitive transmission; and the transmission of the second type may include a repetitive transmission.

In some embodiments, the method 1500 may further comprise: transmitting, to the terminal device 120, further scheduling information for scheduling a repetitive transmission of the transmission in a third slot between the first slot and the second slot, the further scheduling information comprising a further target offset selected from the second group of candidate offsets to indicate the second slot.

In some embodiments, the method 1500 may further comprise: transmitting, to the terminal device 120, a first set of candidate offsets for transmissions of the first type and a second set of candidate offsets for transmissions of the second type; transmitting, to the terminal device 120, an indication that the first set of candidate offsets is the first group of candidate offsets; and transmitting, to the terminal device 120, an indication that the second set of candidate offsets is the second group of candidate offsets.

In some embodiments, the method 1500 may further comprise: transmitting, to the terminal device 120, a first set of candidate offsets for transmissions without repetition and a second set of candidate offsets for transmissions with repetition; transmitting, to the terminal device 120, an indication that a combination of the first set of candidate offsets and a part of the second set of candidate offsets for first-time transmissions is the first group of candidate offsets; and transmitting, to the terminal device 120, an indication that a further part of the second set of candidate offsets is the second group of candidate offsets.

In some embodiments, the method 1500 may further comprise: determining that the set of feedback indications is arranged based on magnitudes of candidate offsets in the first set of candidate offsets and the part of the second set of candidate offsets; or determining that the set of feedback indications is arranged by concatenating feedback indications associated with the first set of candidate offsets and feedback indications associated with the part of the second set of candidate offsets.

In some embodiments, the method 1500 may further comprise: transmitting, to the terminal device 120, a set of candidate offsets for transmissions of the first type and transmissions of the second type; transmitting, to the terminal device 120, an indication that a part of the set of candidate offsets for transmissions of the first type is the first group of candidate offsets; and transmitting, to the terminal device 120, an indication that a further part of the set of candidate offsets is the second group of candidate offsets.

In some embodiments, determining the set of slots may comprise: in accordance with a determination that there is a common candidate offset between the first group of candidate offsets and the second group of candidate offsets, determining a slot based on the second slot and the common candidate offset.

Figure 16:
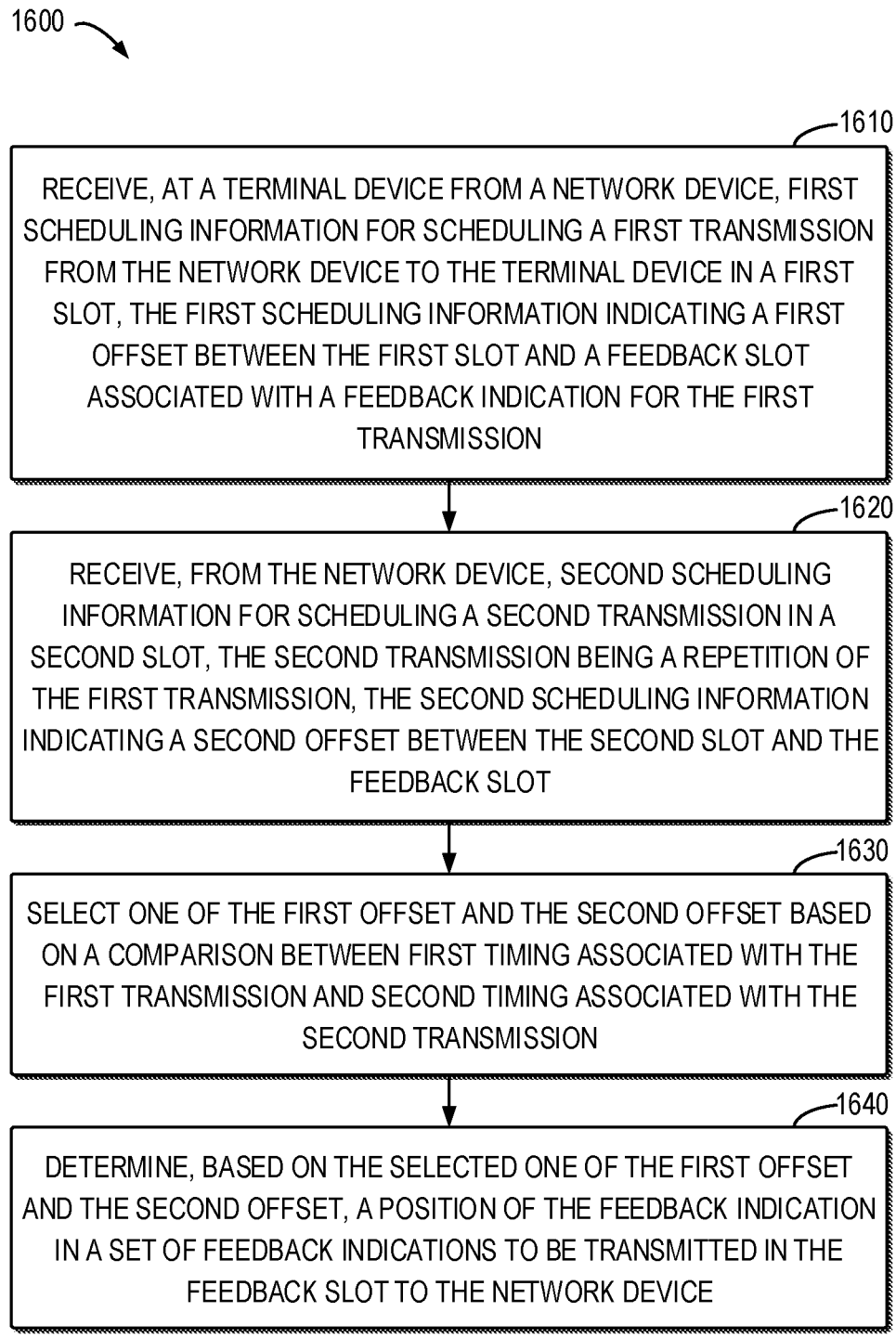
FIG. 16 illustrates a flowchart of an example method in accordance with some embodiments of the present disclosure.

FIG. 16 illustrates a flowchart of an example method 1600 in accordance with some embodiments of the present disclosure. In some embodiments, the method 1600 can be implemented at a terminal device, such as the terminal device 120 as shown in FIG. 1, for performing the communication process 600 as shown in FIG. 6 with a network device. Additionally or alternatively, the method 1600 can also be implemented at other terminal devices not shown in FIG. 1. For the purpose of discussion, the method 1600 will be described with reference to FIG. 1 as performed by the terminal device 120 without loss of generality.

At block 1610, the terminal device 120 may receive, from the network device 110, first scheduling information for scheduling a first transmission from the network device 110 to the terminal device in a first slot, the first scheduling information indicating a first offset between the first slot and a feedback slot associated with a feedback indication for the first transmission. At block 1620, the terminal device 120 may receive, from the network device 110, second scheduling information for scheduling a second transmission in a second slot, the second transmission being a repetition of the first transmission, the second scheduling information indicating a second offset between the second slot and the feedback slot. At block 1630, the terminal device 120 may select one of the first offset and the second offset based on a comparison between first timing associated with the first transmission and second timing associated with the second transmission. At block 1640, the terminal device 120 may determine, based on the selected one of the first offset and the second offset, a position of the feedback indication in a set of feedback indications to be transmitted in the feedback slot to the network device 110.

In some embodiments, selecting the one of the first offset and the second offset may comprise: determining that the first scheduling information associated with the first transmission is prior to the second scheduling information associated with the second transmission; and selecting, from the first offset and the second offset, the one associated with the first scheduling information.

In some embodiments, selecting the one of the first offset and the second offset may comprise: determining a preceding transmission from the first transmission and the second transmission; and selecting, from the first offset and the second offset, the one associated with the preceding transmission.

In some embodiments, the method 1600 may further comprise: generating the set of feedback indications based on the determined position of the feedback indication; and transmitting the set of feedback indications to the network device 110.

Figure 17:
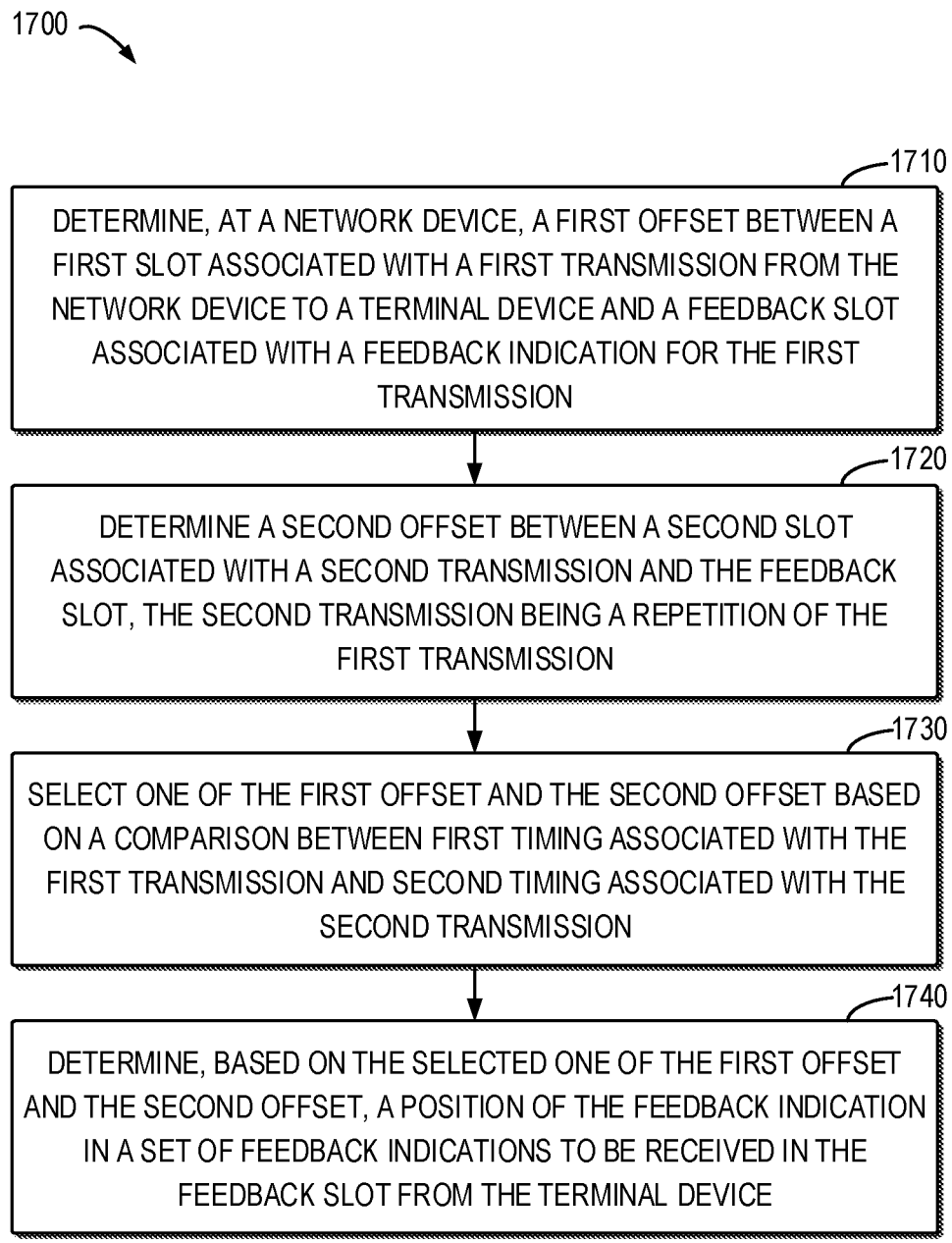
FIG. 17 illustrates a flowchart of an example method in accordance with some embodiments of the present disclosure.

FIG. 17 illustrates a flowchart of another example method 1700 in accordance with some embodiments of the present disclosure. In some embodiments, the method 1700 can be implemented at a network device, such as the network device 110 as shown in FIG. 1, for performing the communication process 600 as shown in FIG. 6 with a terminal device. Additionally or alternatively, the method 1700 can also be implemented at other network devices not shown in FIG. 1. For the purpose of discussion, the method 1700 will be described with reference to FIG. 1 as performed by the network device 110 without loss of generality.

At block 1710, the network device 110 may determine a first offset between a first slot associated with a first transmission from the network device 110 to the terminal device 120 and a feedback slot associated with a feedback indication for the first transmission. At block 1720, the network device 110 may determine a second offset between a second slot associated with a second transmission and the feedback slot, the second transmission being a repetition of the first transmission. At block 1730, the network device 110 may select one of the first offset and the second offset based on a comparison between first timing associated with the first transmission and second timing associated with the second transmission. At block 1740, the network device 110 may determine, based on the selected one of the first offset and the second offset, a position of the feedback indication in a set of feedback indications to be received in the feedback slot from the terminal device 120.

In some embodiments, selecting the one of the first offset and the second offset comprises: determining that first scheduling information associated with the first transmission is prior to second scheduling information associated with the second transmission; and selecting, from the first offset and the second offset, the one associated with the first scheduling information.

In some embodiments, selecting the one of the first offset and the second offset comprises: determining a preceding transmission from the first transmission and the second transmission; and selecting, from the first offset and the second offset, the one associated with the preceding transmission.

In some embodiments, the method 1700 may further comprise: transmitting, to the terminal device 120, first scheduling information for scheduling the first transmission in the first slot, the first scheduling information indicating the first offset; and transmitting, to the terminal device 120, second scheduling information for scheduling the second transmission in the second slot, the second scheduling information indicating the second offset.

In some embodiments, the method 1700 may further comprise: receiving the set of feedback indications from the terminal device 120; and obtaining the feedback indication at the determined position in the set of feedback indications.

Figure 18:
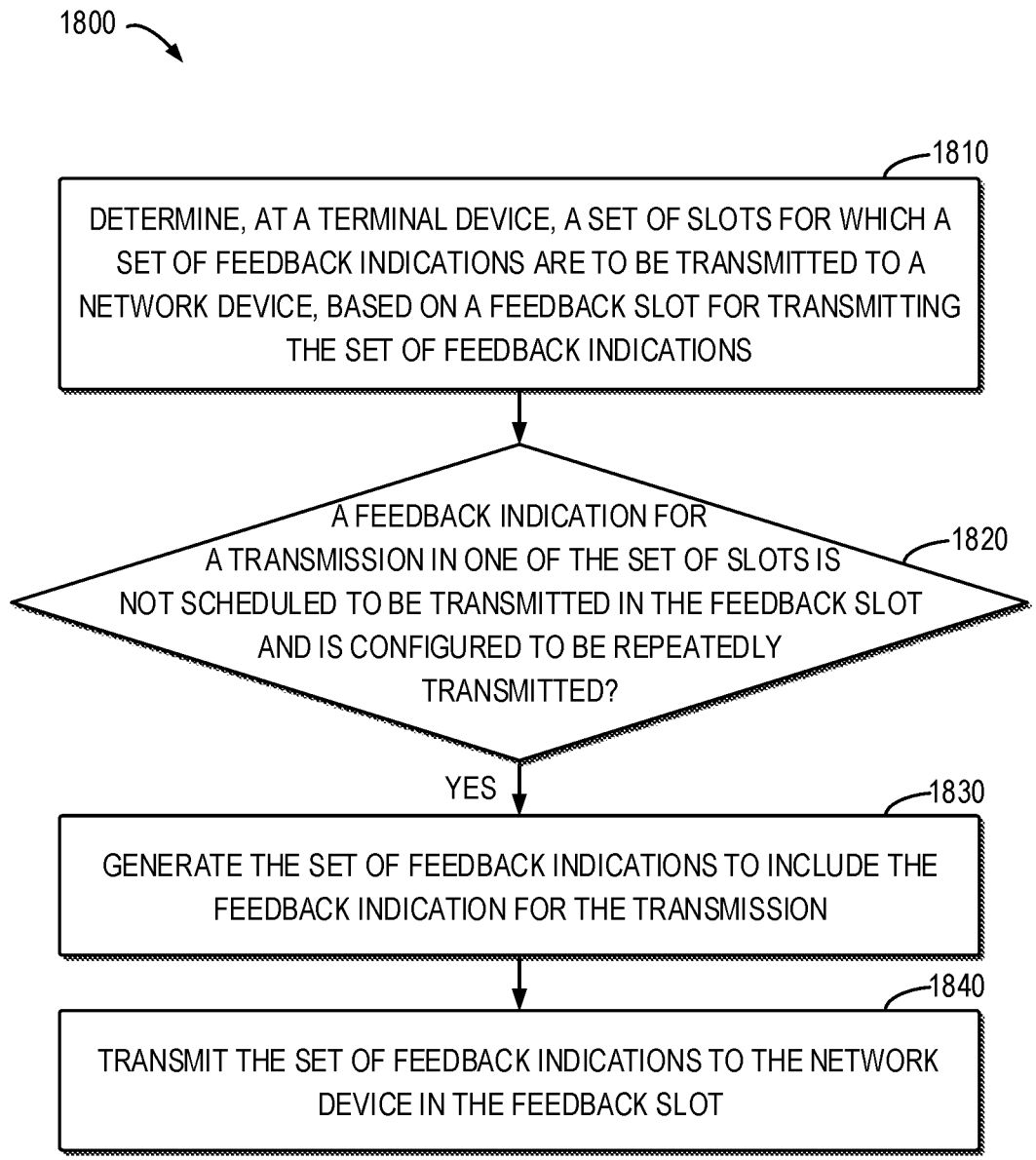
FIG. 18 illustrates a flowchart of an example method in accordance with some embodiments of the present disclosure.

FIG. 18 illustrates a flowchart of an example method 1800 in accordance with some embodiments of the present disclosure. In some embodiments, the method 1800 can be implemented at a terminal device, such as the terminal device 120 as shown in FIG. 1, for performing the communication process 800 as shown in FIG. 8 with a network device. Additionally or alternatively, the method 1800 can also be implemented at other terminal devices not shown in FIG. 1. For the purpose of discussion, the method 1800 will be described with reference to FIG. 1 as performed by the terminal device 120 without loss of generality.

At block 1810, the terminal device 120 may determine a set of slots for which a set of feedback indications are to be transmitted to the network device 110, based on a feedback slot for transmitting the set of feedback indications. At block 1820, the terminal device 120 may determine whether a feedback indication for a transmission from the network device 110 to the terminal device 120 in one of the set of slots is not scheduled to be transmitted in the feedback slot and is configured to be repeatedly transmitted. At block 1830, in accordance with a determination that a feedback indication for a transmission from the network device 110 to the terminal device 120 in one of the set of slots is not scheduled to be transmitted in the feedback slot and is configured to be repeatedly transmitted, the terminal device 120 may generate the set of feedback indications to include the feedback indication for the transmission. At block 1840, the terminal device 120 may transmit the set of feedback indications to the network device 110 in the feedback slot.

Figure 19:
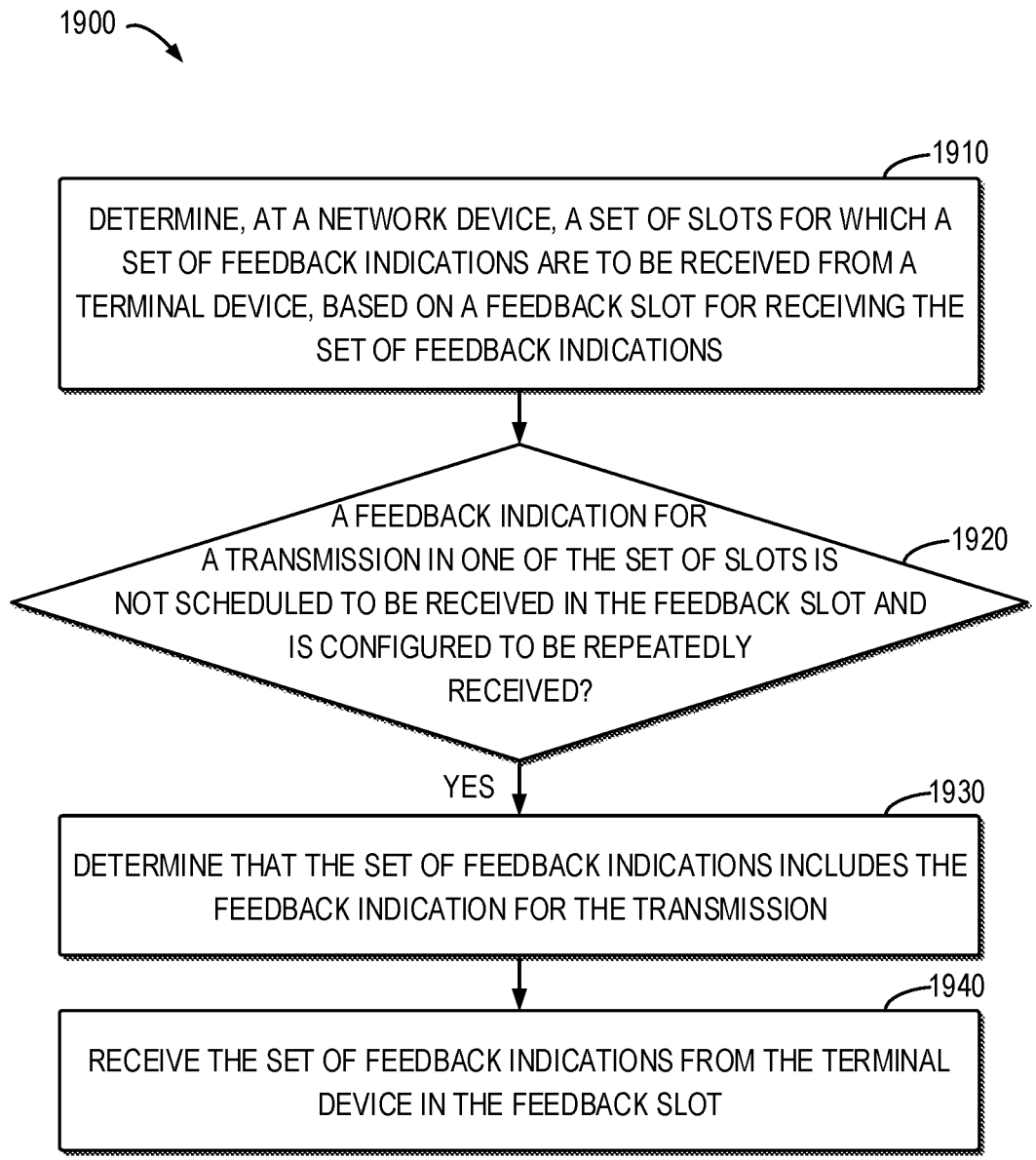
FIG. 19 illustrates a flowchart of an example method in accordance with some embodiments of the present disclosure.

FIG. 19 illustrates a flowchart of another example method 1900 in accordance with some embodiments of the present disclosure. In some embodiments, the method 1900 can be implemented at a network device, such as the network device 110 as shown in FIG. 1, for performing the communication process 800 as shown in FIG. 8 with a terminal device. Additionally or alternatively, the method 1900 can also be implemented at other network devices not shown in FIG. 1. For the purpose of discussion, the method 1900 will be described with reference to FIG. 1 as performed by the network device 110 without loss of generality.

At block 1910, the network device 110 may determine a set of slots for which a set of feedback indications are to be received from the terminal device 120, based on a feedback slot for receiving the set of feedback indications. At block 1920, the network device 110 may determine whether a feedback indication for a transmission from the network device 110 to the terminal device 120 in one of the set of slots is not scheduled to be received in the feedback slot and is configured to be repeatedly received. At block 1930, in accordance with a determination that a feedback indication for a transmission from the network device 110 to the terminal device 120 in one of the set of slots is not scheduled to be received in the feedback slot and is configured to be repeatedly received, the network device 110 may determine that the set of feedback indications includes the feedback indication for the transmission. At block 1940, the network device 110 may receive the set of feedback indications from the terminal device 120 in the feedback slot.

Figure 20:
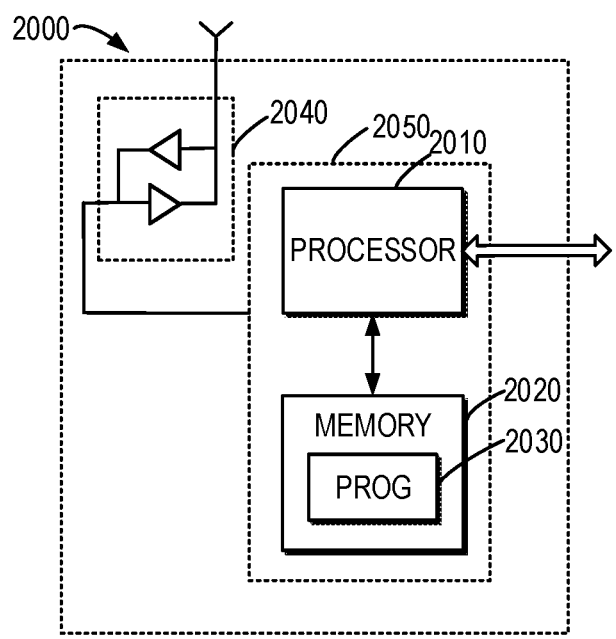
FIG. 20 is a simplified block diagram of a device that is suitable for implementing some embodiments of the present disclosure.

FIG. 20 is a simplified block diagram of a device 2000 that is suitable for implementing some embodiments of the present disclosure. The device 2000 can be considered as a further embodiment of the network device 110 and the terminal device 120 as shown in FIG. 1. Accordingly, the device 2000 can be implemented at or as at least a part of the network device 110 and the terminal device 120.

As shown, the device 2000 includes a processor 2010, a memory 2020 coupled to the processor 2010, a suitable transmitter (TX) and receiver (RX) 2040 coupled to the processor 2010, and a communication interface coupled to the TX/RX 2040. The memory 2020 stores at least a part of a program 2030. The TX/RX 2040 is for bidirectional communications. The TX/RX 2040 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 2030 is assumed to include program instructions that, when executed by the associated processor 2010, enable the device 2000 to operate in accordance with the embodiments of the present disclosure, as discussed herein with reference to any of FIGS. 14 to 19. The embodiments herein may be implemented by computer software executable by the processor 2010 of the device 2000, or by hardware, or by a combination of software and hardware. The processor 2010 may be configured to implement various embodiments of the present disclosure. Furthermore, a combination of the processor 2010 and memory 2020 may form processing means 2050 adapted to implement various embodiments of the present disclosure.

The memory 2020 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 2020 is shown in the device 2000, there may be several physically distinct memory modules in the device 2000. The processor 2010 may be of any type suitable to the local technical network, and may include one or more of general purpose computers, special purpose computers, microprocessors, digital signal processors (DSPs) and processors based on multicore processor architecture, as non-limiting examples. The device 2000 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In some embodiments, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 14 to 19. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:
   receiving, from a base station, a Radio Resource Control (RRC) message comprising first information and second information,
      wherein the first information relates to a first set of candidate offsets for a first Physical Downlink Shared Channel (PDSCH) scheduled by first Downlink Control Information (DCI),
      wherein the second information relates to a second set of candidate offsets for a second PDSCH scheduled by second DCI,
      wherein the second set of candidate offsets comprises a first subset of the second set of candidate offsets and a second subset of the second set of candidate offsets, and
      wherein the second subset of the second set of candidate offsets are common candidate offsets between the first set of candidate offsets and the second set of candidate offsets; and
   obtaining a set of feedback indications by concatenating feedback indications for the first PDSCH related to the first set of candidate offsets and feedback indications for the second PDSCH related to the first subset of the second set of candidate offsets.

2. The method according to claim 1, further comprising:
   determining the first set of candidate offsets and the first subset of the second set of candidate offsets as a first group of candidate offsets,
   wherein the set of feedback indications relates to the first group of candidate offsets.

3. The method according to claim 2, further comprising:
   determining the second subset of the second set of candidate offsets as a second group of candidate offsets.

4. The method according to claim 2, further comprising:
   determining the first group of candidate offsets to obtain the set of feedback indications for generating a Hybrid Automatic Repeat Request Acknowledgement (HARQ ACK) codebook.

5. The method according to claim 1, wherein the second subset of the second set of candidate offsets is different from the first subset of the second set of candidate offsets.

6. The method according to claim 1, wherein the set of feedback indications comprises a Hybrid Automatic Repeat Request Acknowledgement (HARQ ACK) codebook.

7. A terminal device comprising:
   one or more memories storing instructions; and
   one or more processors configured to process the instructions to control the terminal device to:
      a receive, from a base station, a Radio Resource Control (RRC) message comprising first information and second information,
         wherein the first information relates to a first set of candidate offsets for a first Physical Downlink Shared Channel (PDSCH) scheduled by first Downlink Control Information (DCI),
         wherein the second information relates to a second set of candidate offsets for a second PDSCH scheduled by second DCI,
         wherein the second set of candidate offsets comprises a first subset of the second set of candidate offsets and a second subset of the second set of candidate offsets, and
         wherein the second subset of the second set of candidate offsets are common candidate offsets between the first set of candidate offsets and the second set of candidate offsets; and
      obtain a set of feedback indications by concatenating feedback indications for the first PDSCH related to the first set of candidate offsets and feedback indications for the second PDSCH related to the first subset of the second set of candidate offsets.

8. The terminal device according to claim 7, wherein the one or more processors are configured to process the instructions to control the terminal device to:
   determine the first set of candidate offsets and the first subset of the second set of candidate offsets as a first group of candidate offsets, and
   wherein the set of feedback indications relates to the first group of candidate offsets.

9. The terminal device according to claim 8, wherein the one or more processors are configured to process the instructions to control the terminal device to:
   determine the second subset of the second set of candidate offsets as a second group of candidate offsets.

10. The terminal device according to claim 8, wherein the one or more processors are configured to process the instructions to control the terminal device to:
    determine the first group of candidate offsets to obtain the set of feedback indications for generating a Hybrid Automatic Repeat request Acknowledgement (HARQ ACK) codebook.

11. The terminal device according to claim 7, wherein the second subset of the second set of candidate offsets is different from the first subset of the second set of candidate offsets.

12. The terminal device according to claim 7, wherein the set of feedback indications comprises a Hybrid Automatic Repeat Request Acknowledgement (HARQ ACK) codebook.

* * * * *